United States Patent
Beaumont

(10) Patent No.: US 12,265,450 B2
(45) Date of Patent: *Apr. 1, 2025

(54) TILE REGION PROTECTION USING MULTIPLE GPUs

(71) Applicant: Imagination Technologies Limited, Kings Langley (GB)

(72) Inventor: Ian Beaumont, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,231

(22) Filed: Dec. 26, 2023

(65) Prior Publication Data

US 2024/0126643 A1   Apr. 18, 2024

Related U.S. Application Data

(63) Continuation of application No. 17/723,606, filed on Apr. 19, 2022, now Pat. No. 11,853,155.

(30) Foreign Application Priority Data

Apr. 19, 2021   (GB) ..................... 2105564

(51) Int. Cl.
   G06F 11/10   (2006.01)
   G06T 1/20   (2006.01)
   G06T 1/60   (2006.01)

(52) U.S. Cl.
   CPC ............ *G06F 11/1004* (2013.01); *G06T 1/20* (2013.01); *G06T 1/60* (2013.01)

(58) Field of Classification Search
   CPC ............... G06F 11/1004; G06F 1/0739; G06F 11/0751; G06F 11/0772; G06F 11/0796;
   (Continued)

(56) References Cited

U.S. PATENT DOCUMENTS 11,853,155 B2 *  12/2023  Beaumont ........... G06F 11/1004
2019/0196926 A1 *  6/2019  Jong ..................... G06T 7/0002
(Continued)

FOREIGN PATENT DOCUMENTS

EP       2735962 A1 *  5/2014  ............. G06F 3/147
GB       2579111 A      6/2020
(Continued)

*Primary Examiner* — Said Broome
*Assistant Examiner* — Donna J. Ricks
(74) *Attorney, Agent, or Firm* — Potomac Law Group, PLLC; Vincent M DeLuca

(57) ABSTRACT

A graphics processing system for performing tile-based rendering of a scene that comprises safety-related primitives. The system comprises a plurality of graphics processing units (GPUs), each configured to i) receive tile data identifying one or more protected tiles comprising at least part of a safety-related primitive, ii) process two respective sets of protected tiles, and iii) based on said processing, generate two respective checksums for each respective set of protected tiles. The two respective sets of protected tiles are mutually exclusive, and each respective set and each protected tile being processed by two different GPUs. The system comprises a comparison unit configured to compare one or more pairs of checksums, each pair comprising a respective checksum generated based on a same respective set of protected tiles and generated by different GPUs. The graphics processing system is configured to perform one or more actions based on an outcome of said comparison.

20 Claims, 13 Drawing Sheets

(58) Field of Classification Search
CPC .............. G06F 11/1629; G06F 9/5027; G06F 11/0739; G06T 1/20; G06T 1/60; G06T 11/40; G06T 15/005
See application file for complete search history.

(56) References Cited

U.S. PATENT DOCUMENTS

2020/0175645 A1* 6/2020 King ..................... G06T 1/60
2020/0380758 A1 12/2020 Novales et al.

FOREIGN PATENT DOCUMENTS

| GB | 2579590 A | 7/2020 |
| GB | 2579592 A | 7/2020 |
| GB | 2579699 A | 7/2020 |

* cited by examiner

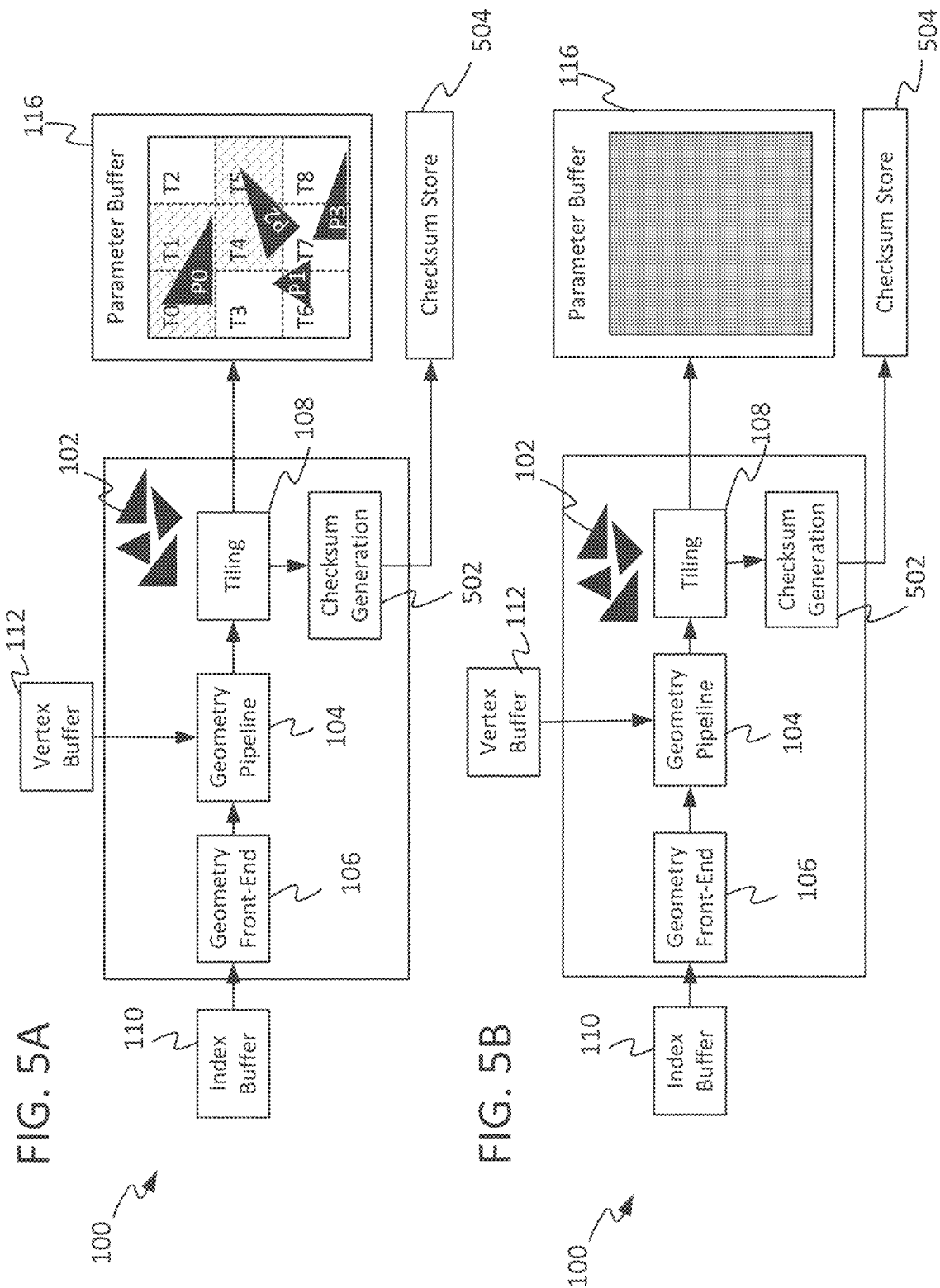

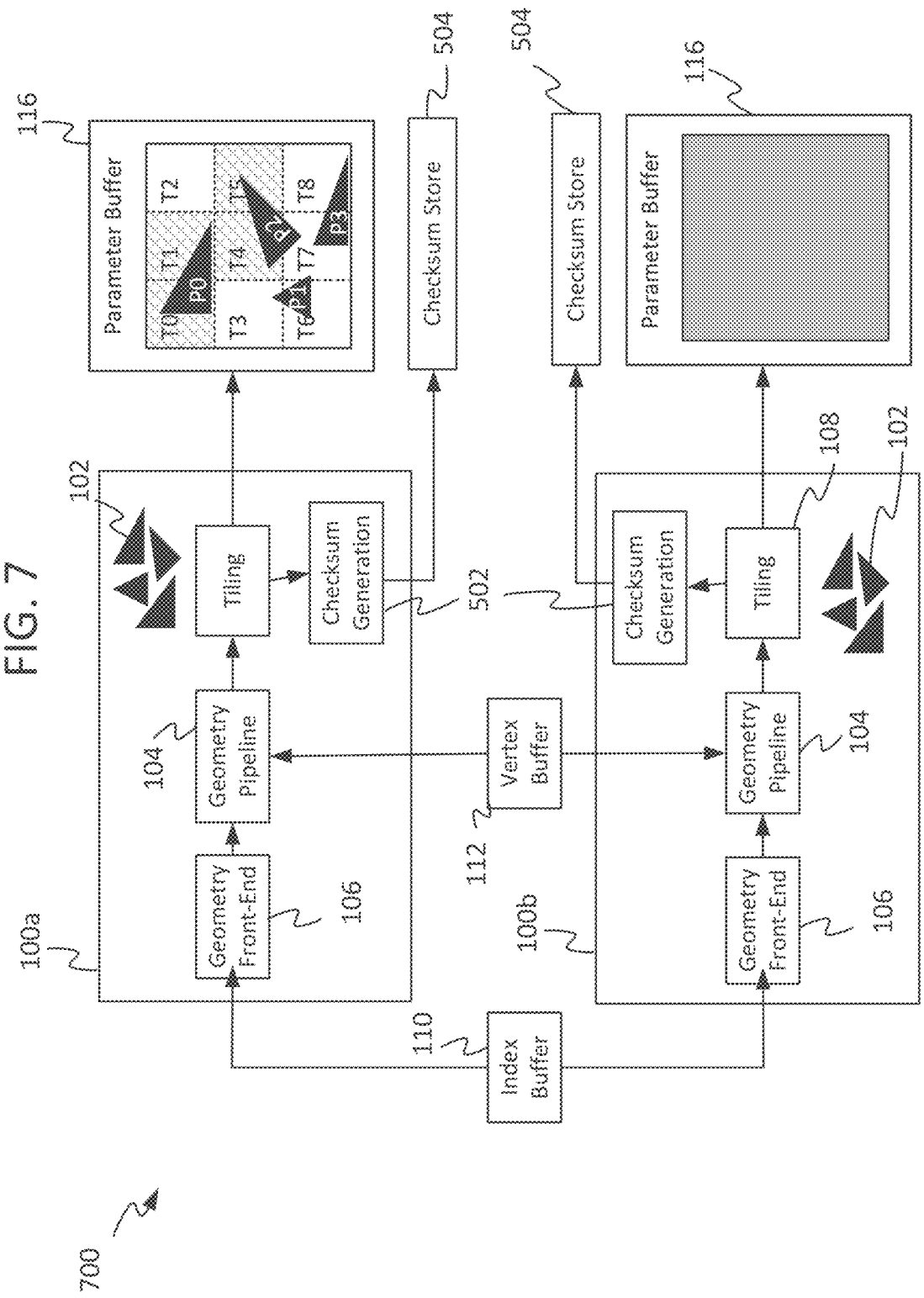

TILE REGION PROTECTION USING MULTIPLE GPUs

CROSS-REFERENCE TO RELATED APPLICATIONS AND CLAIM OF PRIORITY

This application is a continuation under 35 U.S.C. 120 of copending application Ser. No. 17/723,606 filed Apr. 19, 2022, now U.S. Pat. No. 11,853,155, which claims foreign priority under 35 U.S.C. 119 from United Kingdom Application No. 2105564.5 filed Apr. 19, 2021, the contents of which are incorporated by reference herein in their entirety.

BACKGROUND

A processor is a device for executing machine code instructions. A given processor is configured to recognize a certain predefined set of instruction types, referred to as the instruction set of the processor. Each instruction type is defined by a respective opcode and zero or more operand fields. The processor is configured to fetch instructions from memory for execution. The processor may comprise a number of different kinds of sub unit for preforming different categories of operations, depending on the type of the instruction being executed. E.g. the processor may comprise an integer arithmetic logic unit for performing integer arithmetic operations in response to arithmetic instruction types, a floating point arithmetic logic unit for performing floating point operations in response to floating point instruction types, and a load-store unit for performing memory access operations in response to load and store instruction types.

For instance, in a reduced instruction set computer (RISC), a load instruction takes at least two operands: a source memory address and an identifier specifying a destination register in a register file of the processor. When executed, the load instruction acts on the load-store unit to load a value from the source address into the destination register. Logic instructions may take different numbers of operands depending on the type of instruction. E.g. a logic instruction such as an add or multiply instruction, etc., may take three operands: two specifying two respective source registers in the register file, and one specifying a destination register in the register file. When executed the logic instruction acts on the relevant logic unit, such as an integer or floating point arithmetic logic unit, in order to perform the relevant logic operation on the values in the specified source registers, and place the result in the specified destination register. The operation to be performed, and which logic unit is triggered to perform this operation, will depend on the opcode of the instruction in question. To store the result of a logic operation back to memory involves a store instruction. A store instruction takes at least two operands: one specifying a source register in the register file and one a destination address in memory. When executed the store instruction acts on the load-store unit to store the value in the specified source register to the destination memory address.

One way in which an application-specific processor, such as a graphics processing unit (GPU), can be tailored to a specific application, is to include one or more specialised instruction types in the instruction set of the processor. Such an instruction type will perform a more complex operation than a simple load, store, add or multiply, etc., triggered in response to a single instance of a single machine code instruction of the type in question. E.g. this could be a particular mathematical operation, such as a multiply-accumulate (MAC), that comes up frequently in the application in question. The same operation could be built from a combination of general purpose add and multiply instructions, or the like, but that would reduce the code density compared to using instructions of a more specialised instruction set.

In some kinds of processor, such as a vector processor, SIMD (single instruction multiple data) or SIMT (single instruction multiple thread) processor, the processor comprises multiple parallel processing channels. Each of the parallel processing channels may comprise a respective instance of at least one of the same kind of logic unit. For example, each channel may comprise a respective arithmetic logic unit (ALU) such as an integer arithmetic logic unit or floating point arithmetic logic unit. In response to execution of the same instance of the same instruction, fetched in a single fetch operation, some or all of the logic units in the different parallel channels are triggered to perform the same operation on different data, e.g. on different elements of a vector in a vector register specified as the source of the operation. For example, each ALU may be operable to perform a multiply-accumulate (MAC), also known as a multiply-add. This takes two multiplication inputs (sometimes referred to as the multiplier and multiplicand) and an addend input (also known as the accumulator), and adds the addend to the product of the two multiplication inputs. The MAC may be implemented as a fused-multiply add whereby the multiply-accumulate is performed in one fused step. The result of the MAC by each parallel logic unit may be placed in a respective element of a destination vector register.

Tile-based rendering refers to the process of dividing the rendering space of a scene (e.g. an image, video frame, computer graphic, etc.) into a grid, and rendering each sub-division (i.e. tile) of the grid separately. The scene may then be output to a display screen, or otherwise displayed. The scene may be two-dimensional or three-dimensional. The grid may be any shape, e.g. a rectangle, and each tile normally has the same shape and size of every other tile, however this is not essential and may depend on the shape of the scene and/or display screen. Tile-based rendering is an alternative to rendering an entire scene at once. Tile-based rendering per se, is known in the art. A brief overview is provided below with reference to FIGS. 1 and 2.

Workload repetition redundancy (WRR) refers to the rendering of a scene twice, and ensuring that both renders match. In other words, the geometry processing phase is performed twice, as is the fragment processing phase. This is particularly important if the scene includes safety-related elements, i.e. elements that serve a safety-related purpose, or otherwise impact a user's safety. For instance, an element may be safety-related if its mis-rendering could affect the user's safety. An example of a scene comprising safety-related elements is a computer-generated vehicle instrument cluster. A vehicle instrument cluster may comprise a speedometer, one or more warning lights, a fuel level indicator, as well as other elements such as an indication of the current radio station that is playing, or a navigation icon. The speedometer may be designated as safety-related because, if it is not rendered correctly, the driver of the vehicle may not know the speed at which the vehicle is travelling. Therefore it is beneficial to render the instrument cluster twice, and check that the renders match, so as to ensure that any faults are not present in the rendering. WRR is described in detail in UK patent application GB2579590A.

Tile region protection (TRP) refers to an optimisation of WRR and is described in detail in UK patent application GB2579592A. An optimisation of WRR is achieved by marking, as safety-related, those primitives that describe safety-related elements. The primitives may be marked by the application. TRP involves rendering the entire geometry processing phase twice because, at the start of the geometry pipeline, it is not yet known which tiles contain safety-related primitives. At the end of the geometry processing phase, it is known which tiles contain safety-related primitives. During the fragment processing phase, only the tiles that contain safety-related primitives are rendered twice. TRP is described in more detail with reference to FIGS. 5A to 7.

Rendering faults are often caused by temporary (i.e. transient) errors. A temporary error may be caused by, for example, a cosmic ray hitting the GPU's memory (e.g. RAM) and causing random bit flipping. Temporary errors may also be caused by voltage spikes or magnetic pulses. Since the error is temporary, when the scene is rendered again, the same fault should not be present. Faults may also be caused by permanent errors. Permanent errors arise when the hardware itself experiences a problem.

SUMMARY

Tile-based rendering typically involves two phases: a geometry processing phase and a fragment processing phase. An overview of the geometry processing phase and the fragment processing phase is provided below with reference to FIGS. 1 and 2 respectively. Each phase may be performed using a single core (i.e. single GPU) or using multiple cores (i.e. multiple GPUs).

TRP has been used for the geometry processing phase in single core and dual core configurations. As will be discussed in more detail below, TRP provides temporary fault coverage when used in a single core configuration. Permanent faults are not detected because when the geometry processing phase is repeated on the same core, a permanent hardware error will result in the same permanent fault for both renderings. The outputs will match, but still contain the fault. TRP provides both temporary and permanent fault coverage when used in a dual core configuration because the geometry processing phase is performed by different cores, and therefore a fault caused by a permanent error on one core will not exist in the output produced by the other core that does not have the same permanent error.

TRP has also been used for the fragment processing phase in a single core configuration. For reasons similar to those given above, this only provides temporary fault coverage. However until now, TRP has not been expanded to work in a dual-core configuration, or more generally, a multi-core configuration. Thus existing tile-based rendering systems are prone to faults caused by permanent errors. This is particularly problematic when the scene to be rendered includes safety-critical elements.

According to one aspect disclosed herein, there is provided a graphics processing system for performing tile-based rendering of a scene. The system comprises a plurality of graphics processing units. Each graphics processing unit is configured to i) receive tile data identifying one or more protected tiles, ii) process two respective sets of the protected tiles, and iii) based on said processing, generate two respective checksums, one for each respective set of protected tiles, wherein each respective set of protected tiles is processed by two different graphics processing units. The system further comprises a comparison unit configured to compare one or more pairs of checksums, wherein each pair comprises a respective checksum generated based on a same respective set of protected tiles and generated by different graphics processing units. The graphics processing system is configured to perform one or more actions based on an outcome of said comparison.

One or more graphics processing units (GPUs) among the plurality of GPUs may process the input data to determine which tiles contain safety-related elements. The GPUs may be performing a first processing phase which is a geometry processing phase. For instance, the input data may comprise identifiers (e.g. in the form of markers, flags, etc.) that are associated with the primitives that are to be positioned within a grid of tiles. The identifiers may be generated by the application wanting to render the scene. For instance, if the scene is a vehicle instrument cluster, the vehicle manufacturer may have deemed which elements of the scene are to be classed as safety-related, e.g. to satisfy safety regulations. The one or more GPU(s) output tile data that identifies which of the tiles contain at least part of a safety-related element. Tiles containing safety-related elements are referred to as "protected tiles", since it is important to "protect" these tiles from faults. The one or more GPU(s) may also perform some or all of the processes involved in the geometry processing phase of tile-based rendering.

The graphics processing units (GPUs) are configured to process (e.g. render) two sets (i.e. groups) of the protected tiles. The GPUs may be performing a second processing phase which is a fragment processing phase. The two sets of protected tiles processed by a given GPU are mutually exclusive. That is, a given protected tile is not processed more than once by the same GPU. However, each protected tile is processed by two different GPUs. Moreover, each set of protected tiles may be processed by two different GPUs. For instance, each protected tile may be associated with a tile number. In a system of two GPUs, each GPU may process a first set consisting of protected tiles having an even tile number, and a second set consisting of protected tiles having an odd tile number. Since each set is processed twice, each protected tile is also processed twice, and by different GPUs. Each GPU may also perform some or all of the processes involved in the fragment processing phase of tile-based rendering.

Each GPU generates two checksums, one for each of the two sets of protected tiles processed by that GPU. That is, each GPU generates a pair of checksums. Given that each set of protected tiles is processed by two different GPUs, a pair of checksums for each set of protected tiles is generated. The pairs of checksums generated based on the same sets of protected tiles are compared by the comparison unit. The graphics processing system (e.g. a GPU, a host CPU, etc.) is configured to perform one or more actions based on the comparison. For example, if the comparison unit detects that a pair of checksums do not match, a fault signal may be raised, e.g. to alert the application that there is a fault. Additionally or alternatively, one or more of the protected tiles may be re-processed, i.e. re-rendered. The protected tiles that are re-processed may be limited to those which have non-matching checksums, or rather those which belong to a set of protected tiles upon which non-matching checksums have been generated.

Processing each protected tile on two different GPUs and checking for faults between checksums generated by different GPUs provides both temporary fault coverage and permanent fault coverage, thus solving the problem of existing tile-based rendering systems.

In some embodiments, each graphics processing unit may be configured to: during a first fragment processing pass, process a first one of the two respective sets of protected tiles and generate the respective checksum generated based on the first set of protected tiles; and during a second fragment processing pass, process a second one of the two respective sets of protected tiles and generate the respective checksum generated based on the second set of protected tiles, wherein the second fragment processing pass begins after the first fragment processing pass has ended.

In other words, TRP may be implemented for the fragment processing phase by splitting the fragment processing phase into two fragment processing passes. During the first fragment processing pass, each graphics processing unit processes a respective set of protected tiles and generates a corresponding checksum. Then, during a second fragment processing pass, each graphics processing unit processes the other set of protected tiles and generates a corresponding checksum.

In alternative embodiments, each graphics processing unit may be configured to, during a single fragment processing pass: process a first one of the two respective sets of protected tiles and generate the respective checksum based on the first set of protected tiles; and process a second one of the two respective sets of protected tiles and generate the respective checksum based on the second set of protected tiles.

That is, TRP may be implemented for the fragment processing phase using only a single fragment processing pass. The protected tiles are split into respective sets, whereby each respective set of protected tiles is processed by two different graphics processing units, and whereby a checksum for each respective set is generated by each graphics processing unit.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

The embodiments described herein may also be used more generally to render any type of scene, and not only scenes containing safety-related primitives.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

BRIEF DESCRIPTION OF THE DRAWINGS

Examples will now be described in detail with reference to the accompanying drawings in which.

Figure 1:
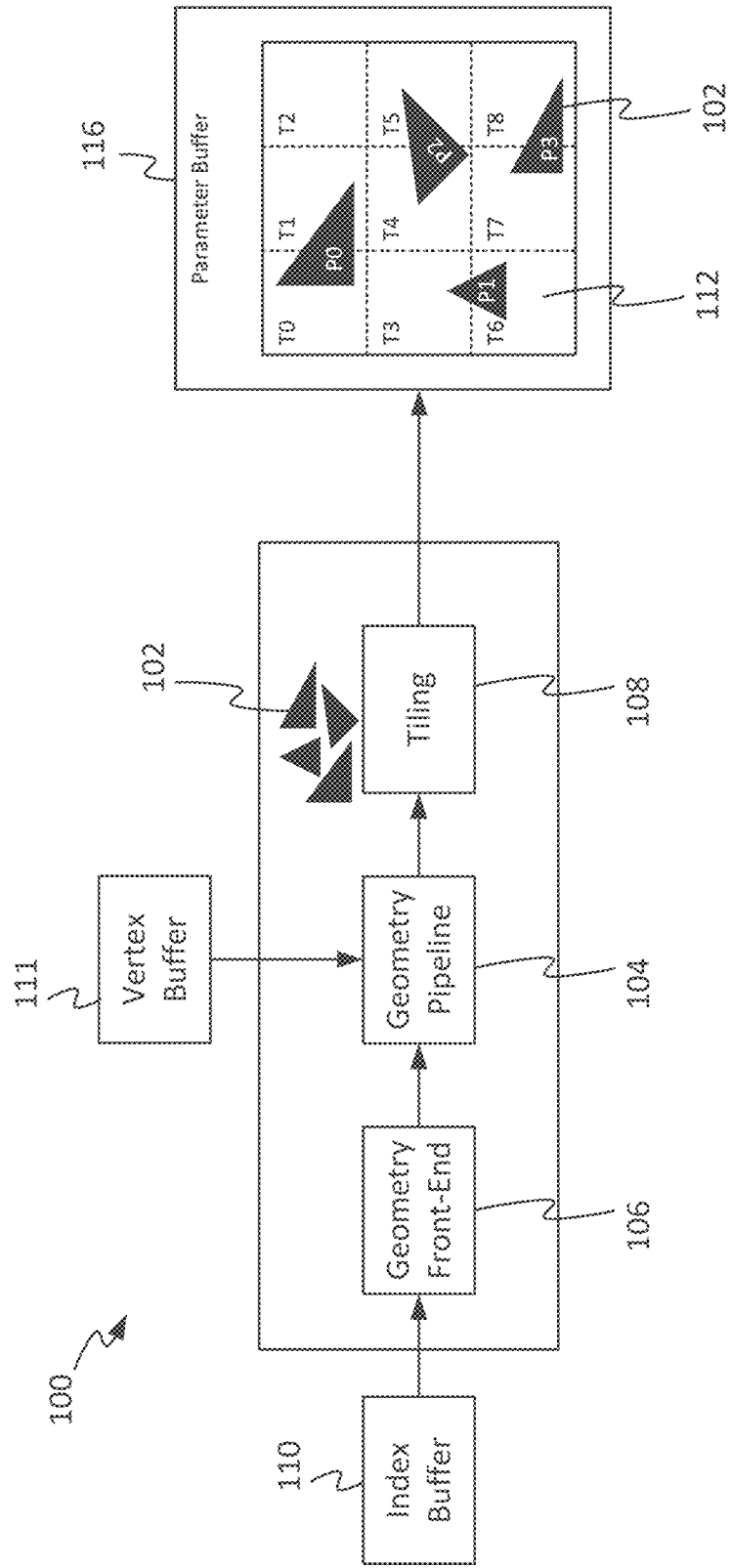
FIG. 1 schematically illustrates an example of a GPU implementing the geometry processing phase of tile-based rendering, FIG. 2 schematically illustrates an example of a GPU implementing the fragment processing phase of tile-based rendering, FIG. 3 schematically illustrates an example parameter buffer including protected tiles, FIG. 4 schematically illustrates a view of a scene comprising both safety-related and non-safety-related elements, FIGS. 5A and 5B schematically illustrate examples of a GPU implementing TRP with first and second passes of the geometry processing phase, respectively, FIGS. 6A and 6B schematically illustrate examples of a GPU implementing TRP with first and second passes of the fragment processing phase, respectively, FIG. 7 schematically illustrates an example of two GPUs implementing TRP with a single pass of the geometry processing phase, FIGS. 8A and 8B schematically illustrate example of two GPUs implementing TRP with first and second passes of the fragment processing phase, respectively, FIGS. 9A to 9D schematically illustrate example distributions of sets of protected tiles amongst different GPUs according to some embodiments, FIGS. 10A to 10C also schematically illustrate example distribution of sets of protected tiles amongst different GPUs according to some embodiments.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 schematically illustrates an example of a graphics processing unit (GPU) 100 performing a first processing phase which is a geometry processing phase. The geometry processing phase involves, amongst other things, sending a sequence of primitives (represented schematically as black triangles) 102 down a pipeline 106, 104, 108 to generate a set of transformed and projected primitives, and to determine the rendering space tiles into which they fall. That is, a tile is a division of the rendering space. Primitives 102 describe the elements (e.g. objects) that make up the scene to be rendered, and may comprise, for example, points, lines, and/or triangles that represent those elements. An element may be, e.g. a computer-generated graphic, such as an icon. The GPU 100 comprises a geometry front-end 106, a geometry pipeline 104, and a tiling component 108. Input data describing the elements are read from memory, e.g. one or more buffers. For instance, a set of indices may be read from an index buffer 110 and supplied to the geometry front-end 106, and then passed to the geometry pipeline 104. Similarly, a set of vertices may be read from a vertex buffer 111 and supplied to the geometry pipeline 104. These buffers are typically stored in memory of the application wanting to render the scene. The geometry pipeline 104 produces a set of primitives 102. The geometry pipeline 104 comprises a series of components (not shown) that translate the input data into primitives 102 and transforms those primitives to form a view of the scene, e.g. a camera view. The camera view may be from the perspective of a user looking at the scene. The geometry pipeline 104 may also project the primitives from the three-dimensional camera space into the two dimensional rendering space (or screen space). The tiling component 108 determines the positions of the screen space primitives 102 within or across one or more tiles 112 of the screen space grid. In other words, a primitive 102 is associated with one or more tiles. Primitives 102 are normally polygons, e.g. triangles. The primitives and their associations with tiles are stored within a buffer, e.g. a parameter buffer 116. The tiles 112 may be stored in a list, e.g. starting with the first tile, and ending with the last tile. The tiles 112 need not be stored in sequential order. Lists of primitives, or references to primitives, that fall within or across each tile may be stored for each tile in the rendering space. The parameter buffer 116 may be stored in memory of the GPU 100. Note that whilst only nine tiles (labelled T0 to T8) are shown in FIG. 1, in general a grid may be made up on any number of tiles 112.

Figure 2:
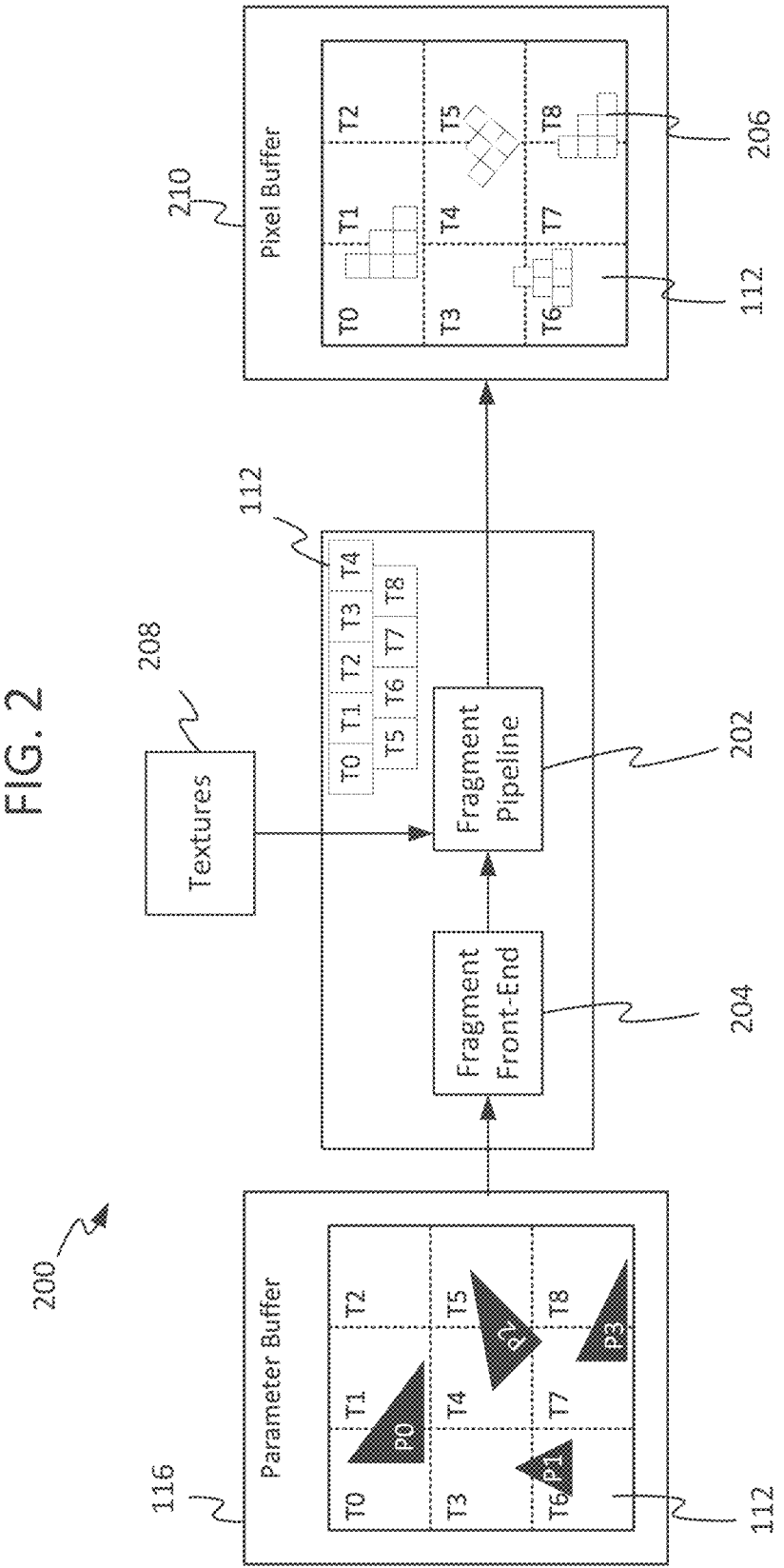

FIG. 2 schematically illustrates a graphics processing unit (GPU) 200 performing a second processing phase which is a fragment processing phase. The fragment processing phase involves, amongst other things, sending primitive data associated with tiles 112 down a fragment pipeline 202 to render those tiles. This may involve by reading a list of references (e.g. pointers) to primitives, and then reading the corresponding primitives from the parameter buffer 116. The GPU comprises a fragment front-end 204 and the fragment pipeline 202. Data for a tile, including the primitives in that tile, is read from the parameter buffer 116 and supplied to the fragment front-end 204 one primitive at a time, before being passed onto the fragment pipeline 202. The fragment pipeline 202 comprises a rasterization component (not shown) configured to perform rasterization and a fragment shader (not shown) configured to perform fragment shading. Rasterization involves converting a primitive described in terms of, e.g. indices and vertices, into a raster image (i.e. a series of pixels that represent the corresponding element). A primitive may be sampled, e.g. at sample positions corresponding to the pixel positions of the rendering space, to generate a series of fragments, each with a screen space position and depth value. Fragment shading involves assigning one or more colour values to each fragment. The fragment pipeline may apply textures to the fragments to determine the colour values that are assigned. The textures are read from a texture data store 208, which is typically stored in application memory. Hidden surface removal may be applied, according to the depth values of the fragments. Finally, colours of one or more fragments may be blended together before being stored in a buffer, e.g. as rendered pixel values 206 in a pixel buffer 210. The pixel buffer 210 may be stored in memory of the GPU 200. Each tile may be rendered independently of other tiles in the rendering space. When each tile has been rendered the render is complete, e.g. the pixel buffer 210 contains a rendered image.

Although described as being performed by separate GPUs 100, 200, part or all of the geometry processing phase and fragment processing phase may be performed by the same GPU. In other words, one GPU may be configured to perform both a first graphics processing phase and a second graphics processing phase, either concurrently or at different times. Moreover, each GPU may be configured to perform part of all of one or more of the following: depth processing, vertex processing, tile acceleration, clipping, culling, primitive assembly, colour processing, stencil processing, anti-aliasing, ray tracing, pixelization and tessellation. The GPU 100 or 200 are processors with hardware features specifically designed for the generation of raster images. In particular, GPUs 100 or 200 include hardware for processing, e.g. shading, fragments of primitives in order to output pixel values.

WRR and TRP have been briefly discussed above. As mentioned, one or more primitives 102 may be marked, flagged, or otherwise indicated as being safety-related, i.e. a primitive that describes or is otherwise associated with a safety-related element of the scene to be rendered. Techniques are known in the art for processing primitives 102 that are marked as being safety-related so as to determine which tiles contain safety-related primitives 102s. For instance, such techniques are described in GB2579590A and GB2579592A. Tiles 112 comprising at least part of a safety-related primitive 102s are referred to as protected tiles 112s, as these tiles need to be protected from faults.

Figure 3:
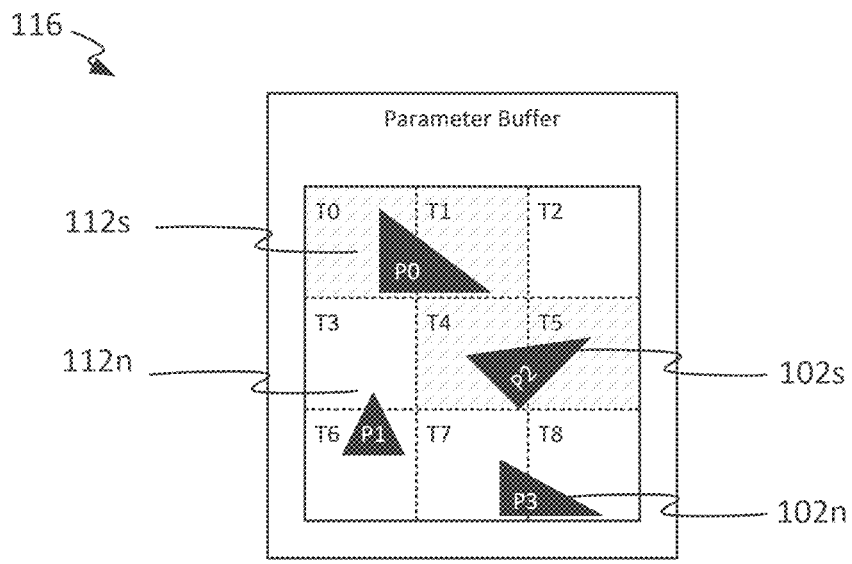

FIG. 3 schematically illustrates a parameter buffer 116 comprising a plurality of tiles 112. In this example, two primitives P0 and P2 are marked as safety-related primitives 102s. Tiles T0, T1, T4 and T5 contain at least part of the safety-related primitives 102s. Those tiles are therefore classed as protected (or safety) tiles 112s, as representing by the patterned fill. In contrast, primitives P1 and P3 are not marked as safety-related, and hence are standard, non-safety-related primitives 102n. Tiles T2, T3, T6, T7 and T8 are classed as unprotected (or non-safety-related) tiles 102n because they do not contain safety-related primitives 102s.

Figure 4:
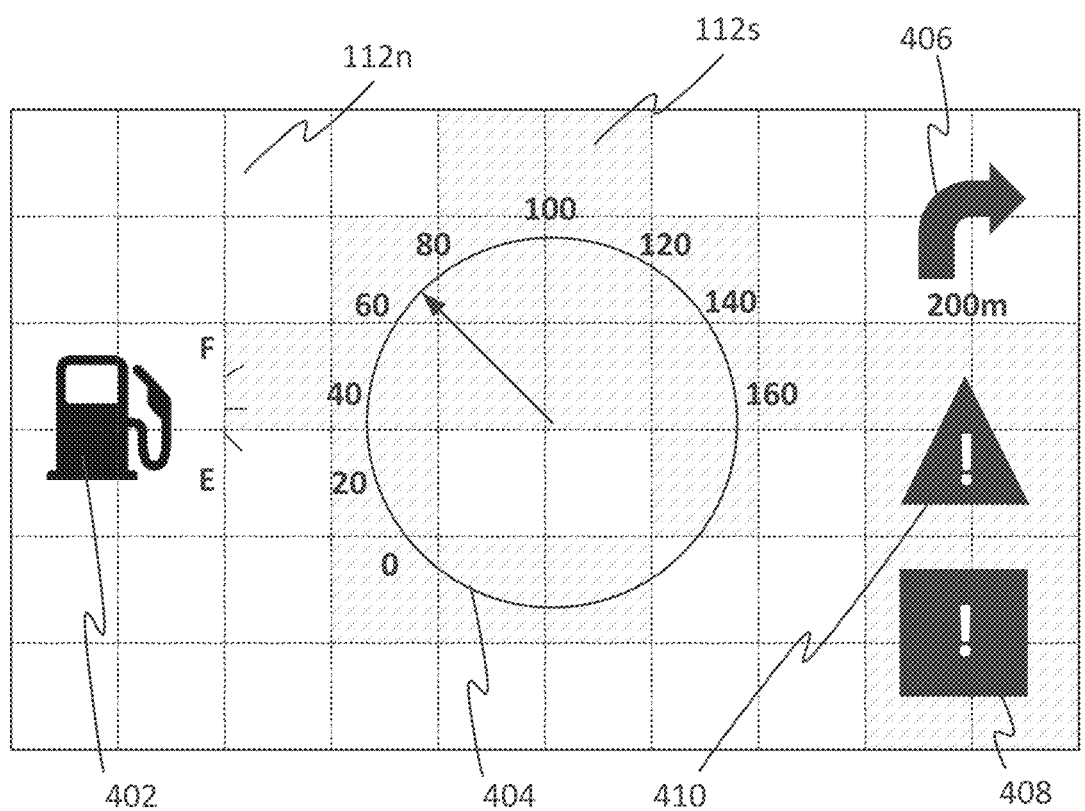

FIG. 4 illustrates an example of a scene 400 to be rendered, e.g. on a display screen such as, for example, a mobile device, laptop monitor, computer monitor, television screen, heads-up display, etc. The scene is divided into a plurality of sub-divisions, i.e. tiles 112. Each tile may be the same shape and size, as shown in FIG. 4. For instance, each tile may be a square. The shape and size of the tiles may vary depending on the screen on which the scene is to be displayed. For instance, if the display screen has curved edges, at least some of the tiles (e.g. along the edge) may vary compared to others (e.g. within the centre). The scene shown in FIG. 4 is that of a vehicle instrument cluster, e.g. for a car. The scene comprises several different elements, including a fuel level indicator 402, a speedometer 404, a navigation icon 406, and two warning lights 408, 410. In this example, only the speedometer 404 and the warning lights are safety-related 408, 410. That is, in this example, the application has indicated that those elements are important for the driver's safety, the safety of other road users, pedestrians, etc.

An element may not necessarily be important to the safety of a user, and may additionally or alternatively be important for the safety of a device, apparatus, machine etc. that comprises the display screen, or for the safety of a device, apparatus, machine etc. that is controlled at least partly based on what is displayed on the display screen. It will be appreciated that whether an element is safety-related will vary with use case. In any case, the scene in FIG. 4 comprises safety-related elements and non-safety-related elements. Therefore the grid of tiles comprises protected, safety-related tiles (tiles containing safety-related elements) 112s and non-protected tiles (tiles that do not contain safety-related elements) 112n.

FIGS. 5A and 5B illustrate TRP used in a single core (single GPU 100) configuration for the geometry processing phase. FIG. 5A represents a first pass of the geometry processing phase or a first geometry processing pass, and FIG. 5B represents a second geometry of the geometry processing phase or a second geometry processing pass. The first pass of the geometry processing phase is similar to the geometry processing phase described with reference to FIG. 1. In addition, the GPU 100 comprises a checksum component 502 configured to generate a first checksum based on the tiles 112 (i.e. the data associated with those tiles) that are to be output to the parameter buffer 116. The checksum represents, e.g. encodes, the contents of the parameter buffer 116, e.g. data associated with tiles. For example, the checksum may be a hash of the data representing the primitives associated with the tiles 112. Other checksums may be used, and will be discussed further below. The first checksum is output to a checksum store 504. The checksum store 504 may be in memory of the GPU 100.

Note that data associated with tiles may be held in multiple linked lists in the parameter buffer so that primitives and other associated data can be reused across tiles.

Note also that all primitives (safety and non-safety) are sent to the checksum block during the geometry processing phase. This is because a non-safety related primitive could interfere with a safety related tile, so it is important that all geometry data is added to (or otherwise encoded by) the checksum.

The GPU 100 is also configured to identity which of the tiles are protected tiles 112 during tiling. The tiles, and their primitives, are written to the parameter buffer 116. Note that it is not possible to know which tiles are safety-related tiles upfront as this is only determined during tiling. Hence why the checksum takes into account all primitives during the geometry processing phase.

The second pass is similar to the first pass except that the primitives 102 are not written to the parameter buffer 116, in order to reduce bandwidth. The primitives 102 are still processed, and a second checksum is generated based on the data representing the primitives associated with the tiles 112. The second checksum is output to the checksum store 504. The first and second checksums are compared, e.g. by a comparison function (not shown). The comparison function may be implemented by hardware or software. If the first and second checksums do not match, then a fault signal is raised. For instance, the fault signal may be output to the application. The application can then respond to the fault signal by, e.g. causing the geometry processing phase to be repeated. Together, the first and second pass provide coverage against temporary faults during the geometry processing phase.

It is not excluded that the primitives 102 may be written to the parameter buffer 116 during the second pass instead of the first pass. In some examples, the second pass cannot begin until the first pass has ended.

Figure 6A:
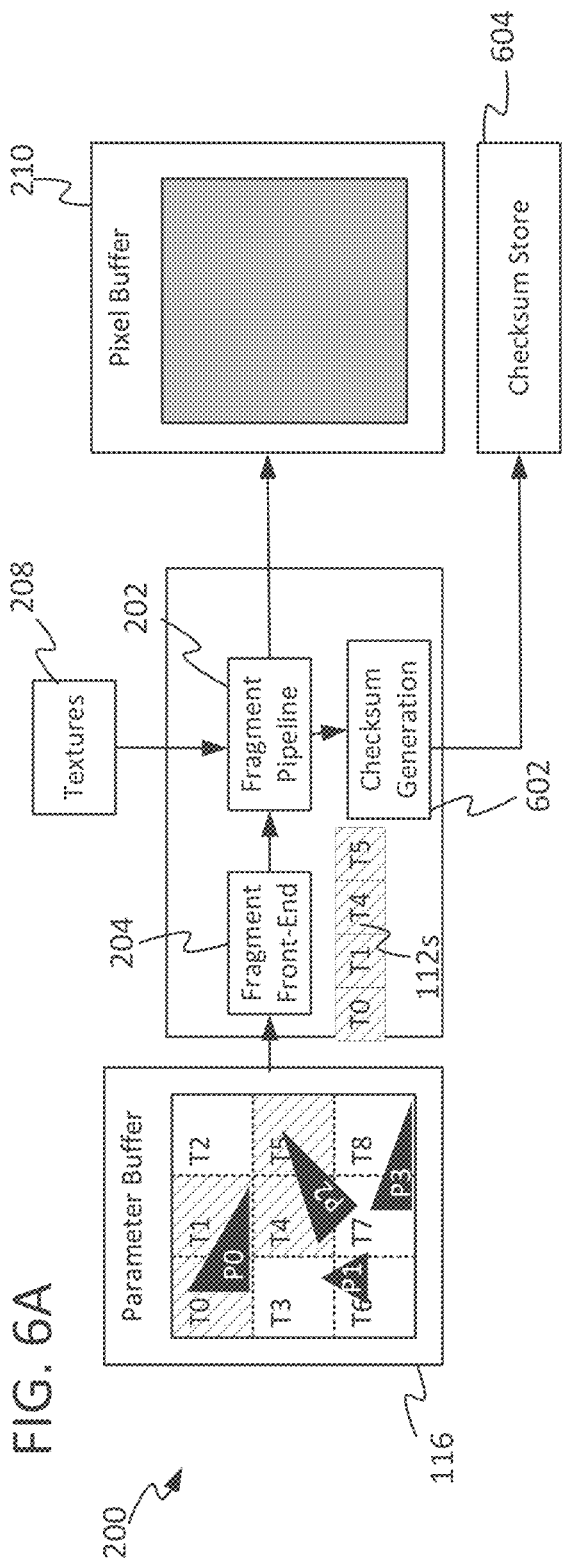
Figure 6B:
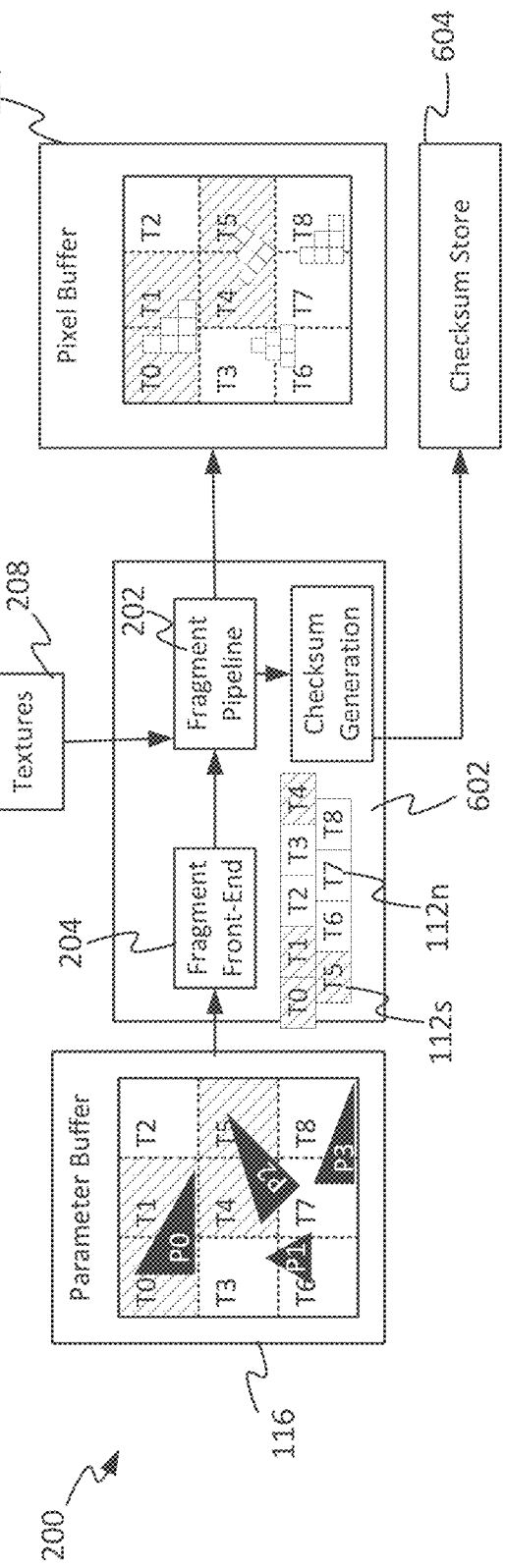

FIGS. 6A and 6B illustrate TRP used in a single core (single GPU 200) configuration for the fragment processing phase. FIG. 6A represents a first pass of the fragment processing phase, and FIG. 6B represents a second pass of the fragment processing phase. The first pass of the fragment processing phase is similar to the fragment processing phase described with reference to FIG. 2. However, unlike the scenario in FIG. 2, the GPU 200 of FIG. 6a is aware of which tiles are safety-related tiles 112s. During the geometry processing phase, tile data is written to the parameter buffer indicating which tiles are protected, i.e. safety-related. The GPU 200 can therefore access this data for use in the fragment processing phase. In the first pass, only the protected tiles 112s are processed, i.e. rendered. The rendered tiles 112 are not written to the pixel buffer 210 during the first pass. A checksum component 602 generates a separate first checksum for each protected tile 112s, and outputs the first checksums to a checksum store 604, e.g. in memory of the GPU 200.

In the second pass, all of the tiles 112 are rendered. That is, both the protected tiles 112s and non-protected tiles 112n are rendered. The rendered tiles 112 are written to the pixel buffer 210. Similar to the first pass, a separate second checksum is generated for each protected tile and output to the checksum store 604. A comparison function compares the pairs of checksums, i.e. the checksum of the safety tiles generated in the first pass against the checksum of the safety tiles generated in the second pass. The comparison function may be implemented by hardware or software. A fault signal is raised if one or more pairs of checksums do not match. In some examples, the fault signal may indicate the protected tile upon which the non-matching checksums are based. Together, the first and second pass provide coverage against temporary faults during the fragment processing phase.

In some embodiments a fault signal is not raised if non-matching checksums are found. In these embodiments a different action is taken, such as re-rendering one or more protected tiles, or re-rendering all tiles.

It is also not excluded that a fault signal may be raised, and an additional action is taken, such as the re-rendering of one or more tiles.

It is not excluded that the rendered tiles may be written to the pixel buffer 210 during the first pass instead of the second pass. In some examples, the second pass cannot begin until the first pass has ended.

FIG. 7 illustrates TRP used in a dual-core configuration for the geometry processing phase. That is, the system 700 comprises two instances of the GPU performing the geometry processing phase, GPUs 100a, 100b. Each GPU 100a, 100b executes concurrent geometry processing passes. Only one of the GPUs 100b writes to the parameter buffer 116. As for the single-core configuration, two checksums are generated based on the entire set of primitives, one by each GPU 100a, 100b. The checksums are then compared by a comparison function. Running the geometry processing phase on two GPUs 100a, 100b and comparing the checksums provides both temporary and permanent fault coverage during the geometry processing phase. This is because permanent faults are caused by a hardware error on one GPU 100a, which will not be present on the other GPU 100b. The safety-related tiles 112s are determined during tiling.

Figure 8A:
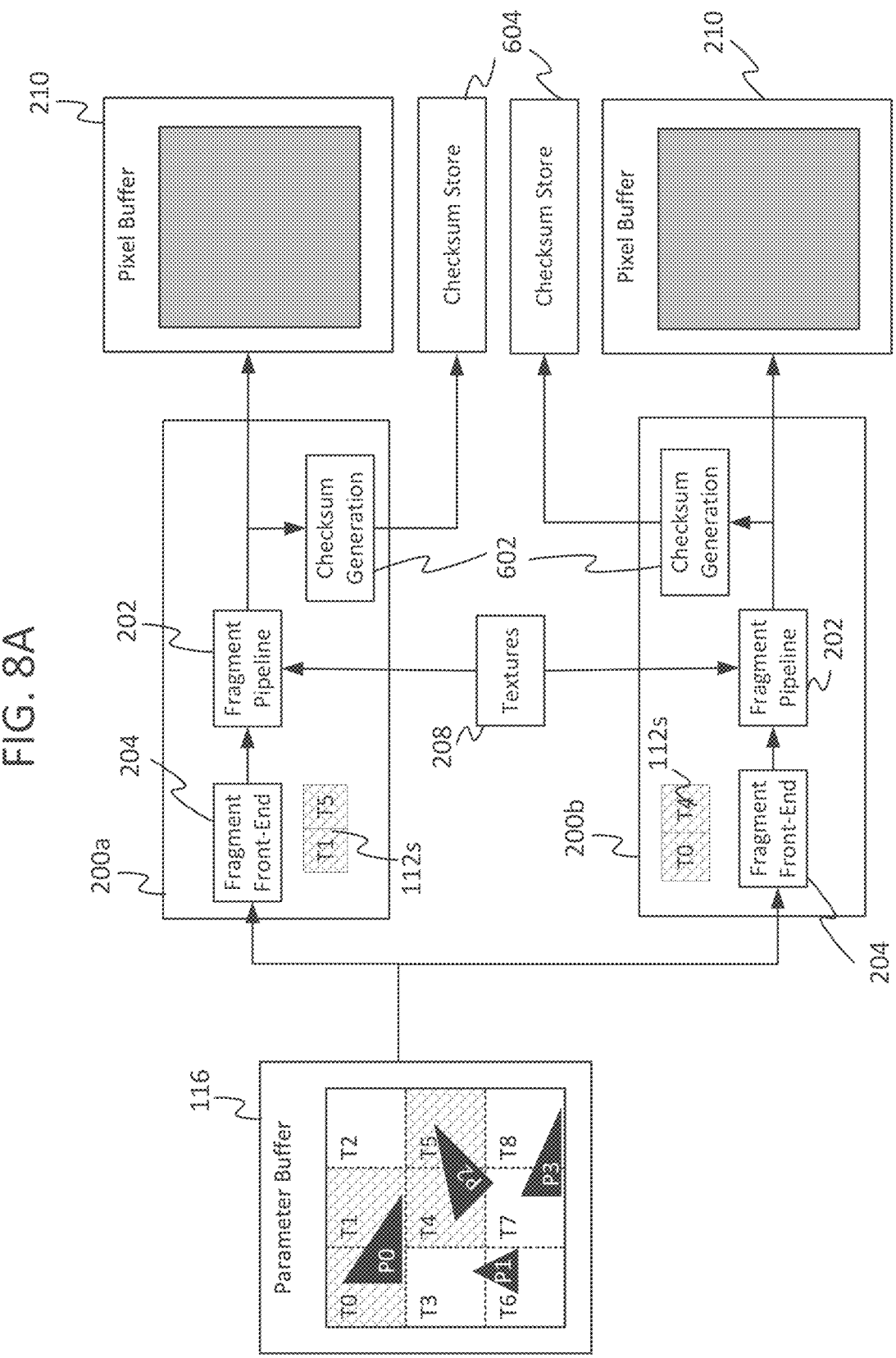
Figure 8B:
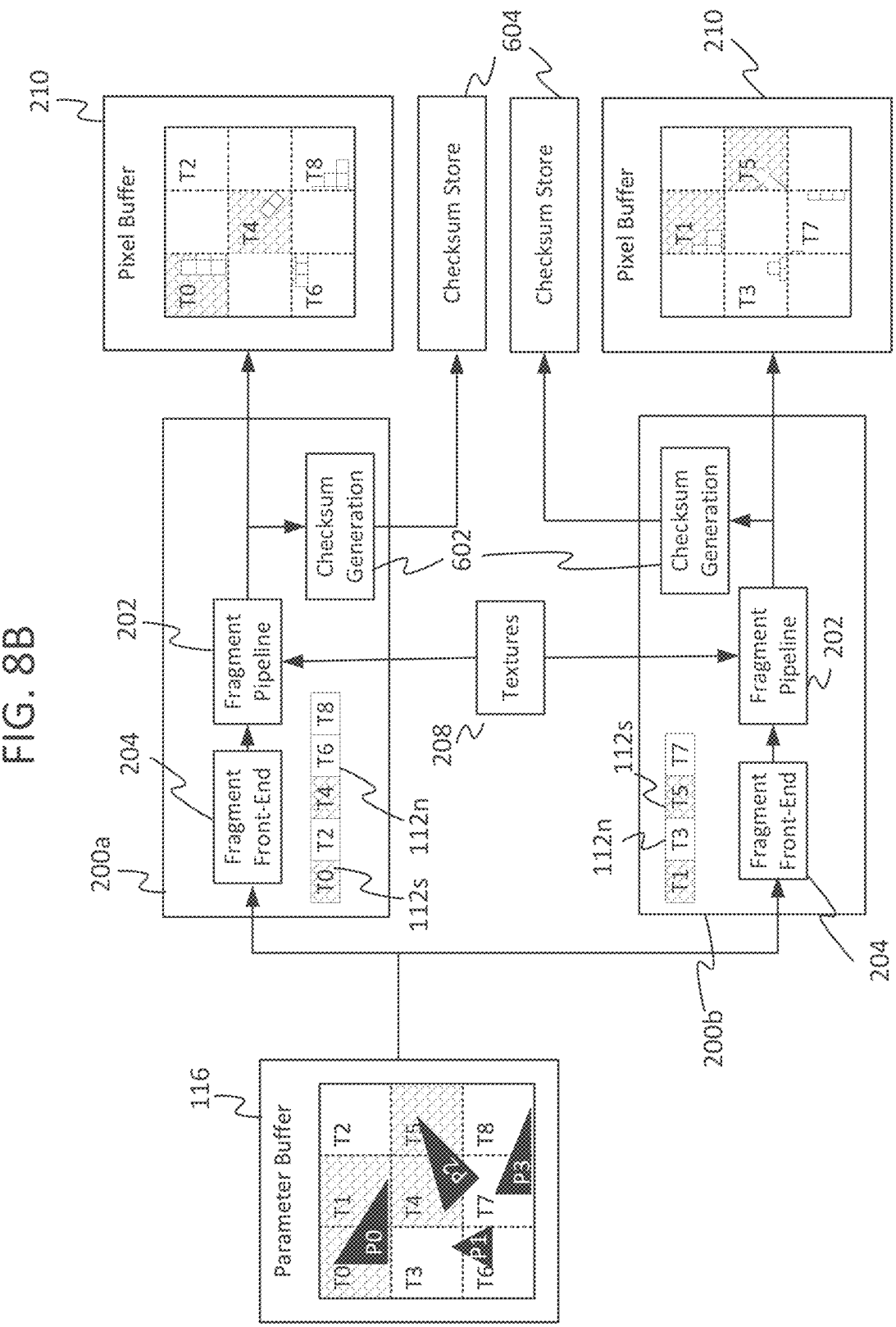

FIGS. 8A and 8B illustrate TRP being used in a dual-core configuration for the fragment processing phase according to some embodiments of the present invention. Whilst only two GPUs performing the fragment processing phase, GPUs 200a, 200b are shown in this example, more generally the system may comprise any number of GPUs 200. In these embodiments, TRP is split across two fragment processing passes: a first pass illustrated in FIG. 8A and a second pass illustrated in FIG. 8B. The parameter buffer 116 comprises one or more protected tiles 112s and one or more non-protected tiles 112n. The protected tiles 112s are marked as such by the one or more GPUs 100 during the geometry processing phase. During the first pass of the fragment processing phase, each GPU 200a and 200b processes a respective set of the protected tiles 112s. The sets may be mutually exclusive. For instance, as shown in FIG. 8A, one GPU 200a process protected tiles T1, T5, whilst the other GPU 200b processes protected tiles T0, T4. Each protected tile 112s may be associated with a tile number, e.g. T0, T1, etc. One of the GPUs 200b may process all of the even numbered protected tiles 112s, and the other GPU 200a may process all of the odd numbered protected tiles 112s. It will be appreciated that the sets may be formed in different ways, e.g. one set comprising the first half of the protected tiles 112s, and the other set comprising the second half of the protected tiles 112s.

Processing of tiles 112 includes rendering those tiles. The rendered tiles are not, however, written to the pixel buffer 210 during the first pass. Each GPU 200 is configured to generate a first checksum based on the set of protected tiles 112s processed by that GPU 200 during the first pass. The first checksums are output such that they are accessible by a comparison function. For instance, the first checksums may be written to one or more checksum stores 604, e.g. stored in GPU memory.

During the second pass of the fragment processing phase, each GPU 200 processes the set of protected tiles 112s that was processed by other GPU 200 during the first pass. That is, the sets of protected tiles 112s remain the same, but now the sets are processed by different GPUs. For instance, as shown in FIG. 8B, the GPU 200a that processed protected tiles T1, T5 during the first pass now processes protected tiles T0, T4 during the second pass, and the GPU 200b that processed protected tiles T0, T4 during the first pass now processes protected tiles T1, T5 during the second pass. In other words, the workload distribution is altered so that protected tiles 112s are rendered on a different GPU 200 compared to the first pass. The rendered tiles are output to the pixel buffer 202.

As is the case with the first pass, each GPU 200 generates a second checksum based on the set of protected tiles 112s processed by that GPU 200 during the second pass. The second checksums are output for access by the comparison function. The comparison function compares the first and second checksums, i.e. pairs of checksums, and outputs a fault signal if a pair of checksums comprises non-matching checksums. This provides both temporary and permanent fault coverage during the fragment processing phase. The comparison function may output a signal which causes the system to perform additional or alternative actions, e.g. the signal may cause a GPU 200 to re-process one or both sets of protected tiles. The set of protected tiles that are re-processed may be those which are known to contain an error due to non-matching checksums.

It is not excluded that the rendered tiles may be output to the pixel buffer 210 during the first pass instead of the second pass.

In addition to the protected tiles 112s, the non-protected tiles 112n may also be processed during the first and/or second pass. For instance, FIGS. 8A and 8B show that the non-protected tiles 112n are only processed during the second pass.

Alternatively, the non-protected tiles 112n may be processed during the first pass only. Workload distribution may be applied such that one GPU 200a processes (renders) a first set of non-protected tiles 112n whilst the other GPU 200b processes a second set of non-protected tiles 112n, which may or may not be mutually exclusive.

The examples of FIGS. 8A and 8B illustrate a first and second pass of the fragment processing phase in a dual-core configuration. It is also not excluded that a first and second pass of the fragment processing phase may be implemented across a configuration of three or more cores. In general, any configuration of multiple cores (i.e. GPUs) can be used. For instance, a configuration may be used such that each protected tile 112s is processed twice, once by one core and once by another core. I.e. each protected tile 112s is processed by two different GPUs 200.

FIGS. 9A to 9D illustrate an example of TRP being implemented across multiple cores during a single fragment processing phase according to some embodiments of the present invention.

Figure 9A:
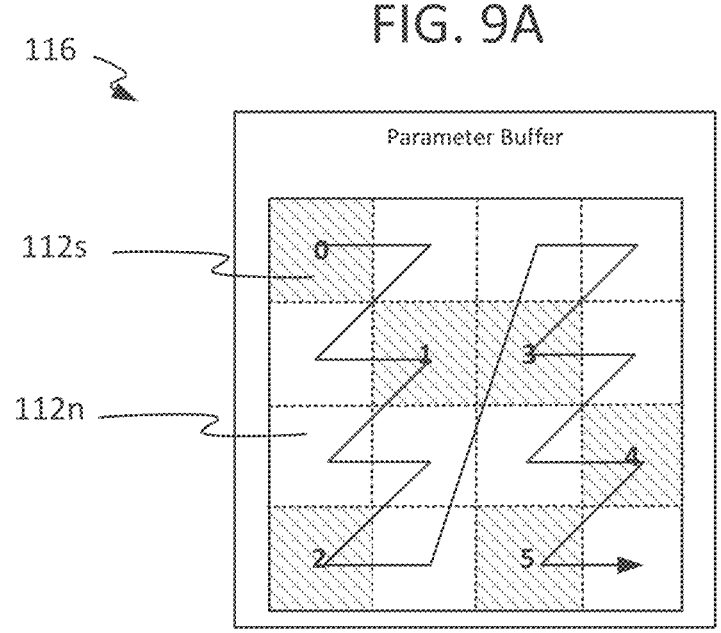

FIG. 9A illustrates a parameter buffer which comprises a plurality of tiles 112, some of which have been marked as protected (safety-related) tiles 112s (shaded), and some of which have not been marked as such (tiles 112n, not shaded). In this example, the tiles 112 are processed in order according to the zig-zag like pattern shown in FIG. 9A. It will be appreciated that this is merely an example, and in general the tiles may be processed in any order. For illustration purposes, the protected tiles 112s are numbered consecutively according to the order in which they would be processed.

Figure 9B:
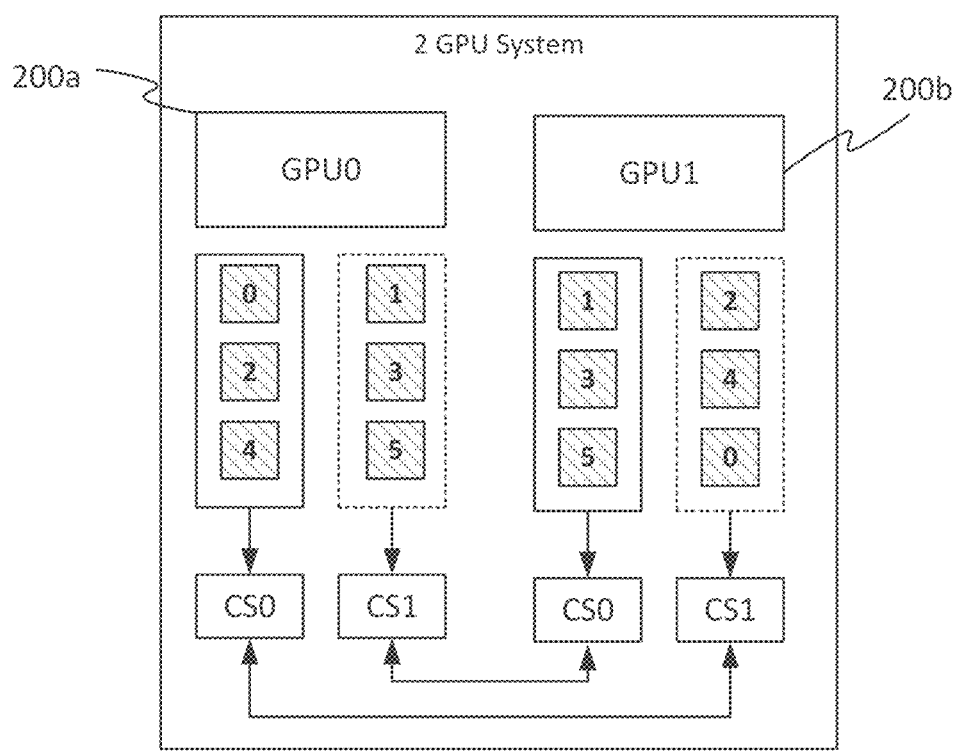

FIG. 9B illustrates an example dual-core configuration. A first one of the GPUs 200 performing a fragment processing phase, GPU 200a is labelled GPU0, and a second GPU 200b is labelled GPU1. Each GPU 200 is configured to process two sets of protected tiles 112s. The two sets of protected tiles 112s may be mutually exclusive to one another. For instance, GPU0 processes a first set comprising protected tiles T0, T2, T4, and a second set comprising protected tiles T1, T3, T5. Each set of protected tiles 112s is processed by a different GPU. For instance, GPU1 processes a first set comprising protected tiles T1, T3, T5, and a second set comprising protected tiles T2, T4, T0. In some examples, only the first set of protected tiles 112s (shown surrounded by a solid line) is output to the pixel buffer, whereas the second set of protected tiles 112s (shown surrounded by a dotted line) are not output to the pixel buffer 202.

Each GPU 200 is configured to compute a checksum for each of the two sets of protected tiles 112s that it processes. For instance, GPU0 computes a first checksum CS0 based on the first set of protected tiles 112s and a second checksum CS1 based on the second set of protected tiles 112s. Similarly, GPU1 computes a first checksum CS0 based on the first set of protected tiles 112s and a second checksum CS1 based on the second set of protected tiles 112s.

Whilst not shown in FIG. 9B, the non-protected tiles 112n are also processed. The checksums are not based on the non-protected tiles 112n. Each non-protected tile 112n may be processed only a single time. In some examples, the non-protected tiles 112n are processed by only one of the GPUs 200. In other examples, the processing of the non-protected tiles may be distributed across the GPUs, e.g. across each of the GPUs.

A comparison component is configured to compare pairs of checksums. Each pair comprises one checksum generated by one GPU 200, and one checksum generated by a different GPU. In the dual-core configuration of FIG. 9B, that means that each pair of checksums comprises a checksum generated by GPU0 and a checksum generated by GPU1. Furthermore, each checksum in a pair of checksums corresponds to the same set of protected tiles 112s. That is, CS0 generated by GPU0 based on protected tiles T0, T2, T4 is compared with CS1 generated by GPU1 based on protected tiles T2, T4, T0. Similarly, CS1 generated by GPU0 based on protected tiles T1, T3, T5 is compared with CS0 generated by GPU1 based on protected tiles T1, T3, T5. If the comparison component determines that a pair of checksums do not match, or otherwise correspond with one another, the comparison unit may raise a fault signal, e.g. to be output to the application or to the GPU to cause re-rendering of the protected tiles. That is, the same fault signal may alert the application and cause re-rendering.

Figure 9C:
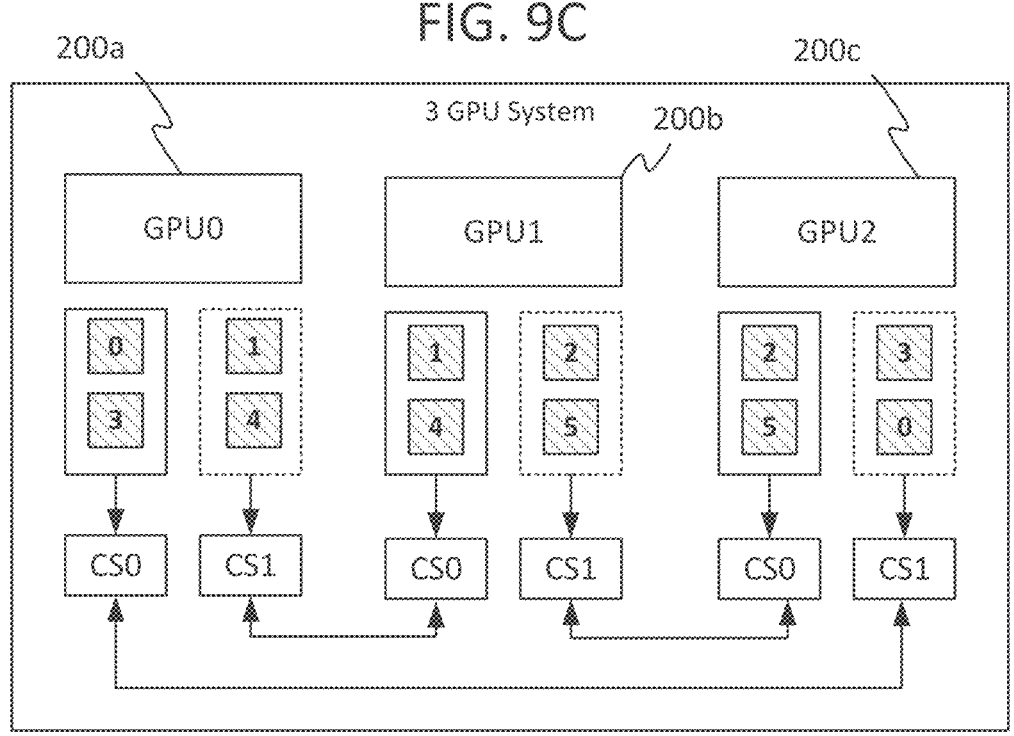
Figure 9D:
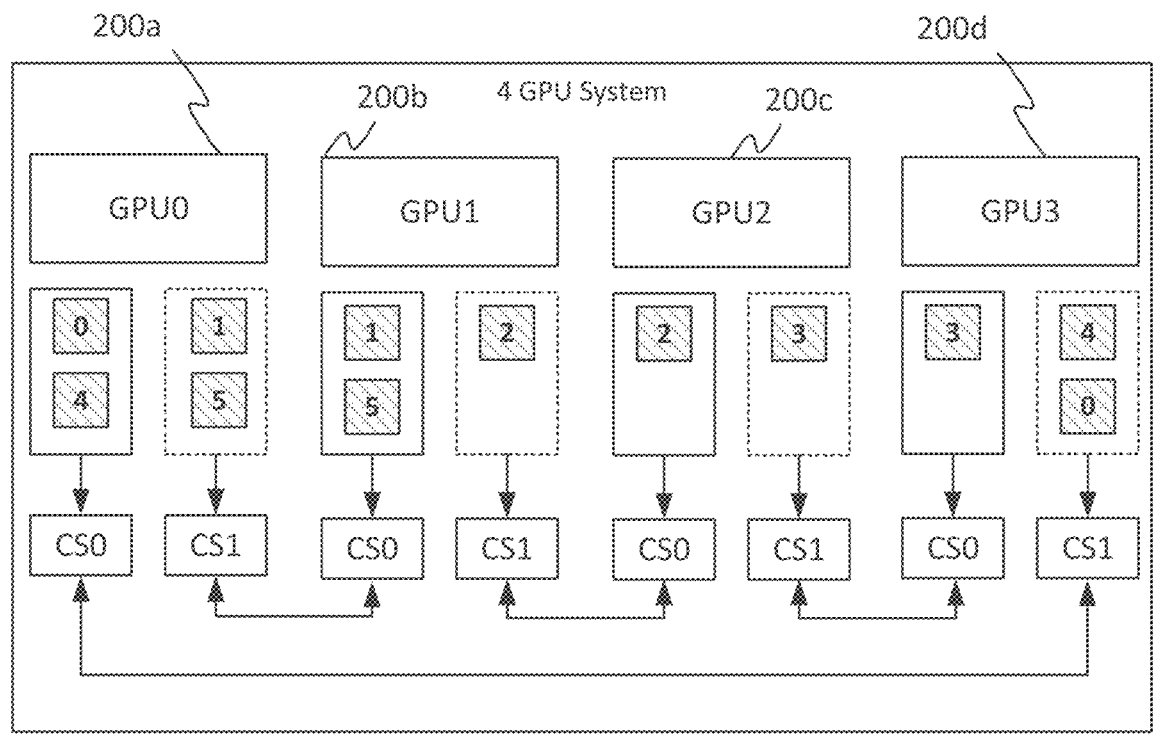

FIGS. 9C and 9D respectively illustrate a three-core and four-core configuration for processing the same set of tiles shown in FIG. 9A. As shown in FIG. 9C, each GPU processes two sets of protected tiles 112s. Given that the number of GPUs 200 has increased relative to the dual-core configuration, in this example the effect is that the number of protected tiles 112s in a set has decreased. However this will depend on the number of protected tiles 112s to be processed. FIG. 9D illustrates an example wherein the number of protected tiles 112s may differ between the sets processed by each GPU. Again, this depends on the number of protected tiles 112s in a given set.

Figure 10A:
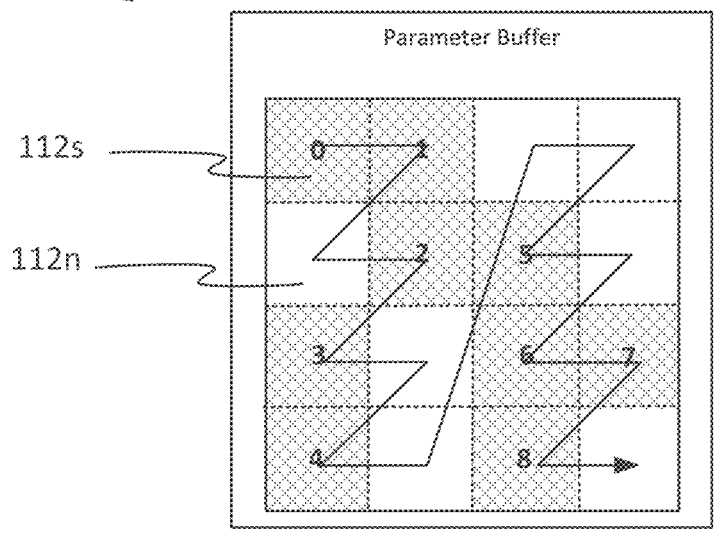
Figure 10B:
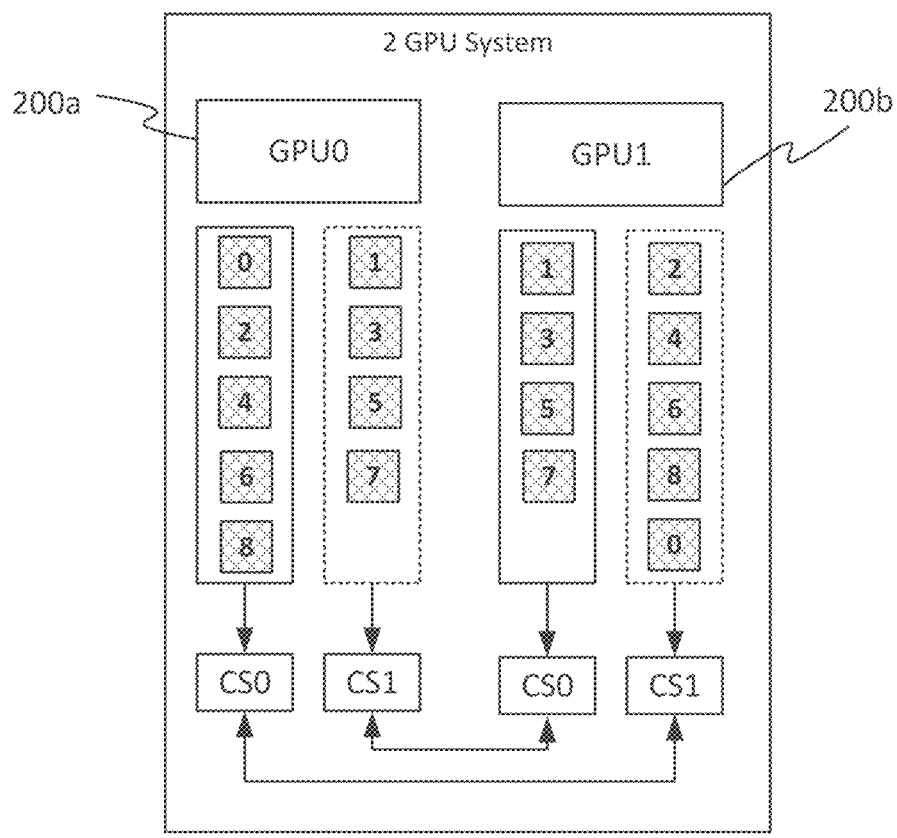
Figure 10C:
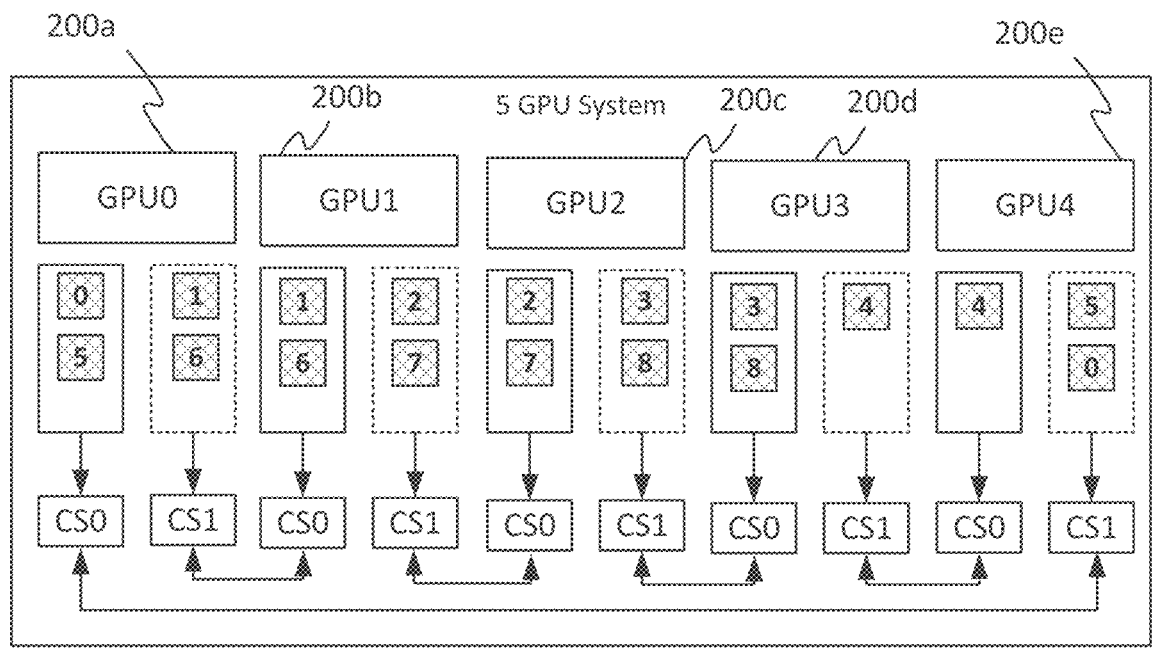

FIG. 10A illustrates another example of a parameter buffer comprising a mixture of protected tiles 112s and non-protected tiles 112n. FIG. 10B illustrates how TRP may be implemented by executing two concurrent fragment processing passes in a single fragment processing phase using a dual-core configuration. FIG. 10C illustrates how TRP may be implemented in a single fragment processing phase by executing five concurrent fragment processing passes using a five-core configuration In these embodiments, each core 200 may render up to two consecutive protected tiles 112s, as described by the following pseudo code:

```
FOR PROTECTED_TILE in 0 to NUM_PROTECTED_TILES_TO_RENDER - 1
    FOR GPU_ID in 0 to NUM_GPUS - 1
        IF GPU_ID = (PROTECTED_TILE mod NUM_GPUS)
            Process PROTECTED_TILE
            Write tile to frame buffer
            Collate result to checksum 0
        END IF
        IF ((GPU_ID+1) mod NUM_GPUS) = (PROTECTED_TILE mod NUM_GPUS)
            Process PROTECTED_TILE
            (Tile not written to frame buffer)
            Collate result to checksum 1
        END IF
    END FOR
END FOR
```

That is, each protected tile 112s may be associated with a respective tile number (PROTECTED_TILE) and each GPU may be associated with a respective GPU number (GPU_ID). Each protected tile is placed into a set based on a set identifier calculated as the respective tile number modulo by a total number of the graphics processing units (PROTECTED_TILE mod NUM_GPUS). For each GPU, the first one of the two respective sets of protected tiles 112s comprises one or more protected tiles 112s having a respective set identifier corresponding to the respective GPU number (GPU_ID). In addition, for each GPU, the second one of the two respective sets of protected tiles 112s comprises one or more protected tiles 112s having a respective set identifier corresponding to the respective GPU number plus one (GPU_ID+1), modulo the total number of the GPUs.

Any given core 200 may render two consecutive protected tiles 112s if they exist. However if a second consecutive protected tile doesn't exist, then no action is taken as shown in the examples of FIGS. 9A to 9D, and FIGS. 10A to 10C. If a core doesn't encounter two protected tiles 112s within its allocated workload distribution scheme (WDS), then it may continue to check tiles until two protected tiles 112s have been encountered and processed—processing any non-protected tiles according to its WDS as it progresses. Cores may dynamically filter every second protected tile such that it doesn't get written out to the frame buffer twice. In order to collect checksums for each pair of protected tiles 112s, two checksums are maintained per GPU. One for the first protected tile in a sequence and one for the second protected tile in a sequence. Checksums may then be compared as described by the following pseudo code:

```
FOR N in 0 to NUM_GPUS - 1
    Compare checksum 1 for GPU_ID:N against checksum 0 for GPU_ID:((N+1) mod NUM_GPUs)
END FOR
```

One or more of the following advantages are achieved by at least some examples of these embodiments:

An even number of protected tiles 112s is not required.

Works with any number of cores

Balances the load of rendering protected tiles 112s across all cores

Provides a high degree of hardware separation between the same fragment tiles

Requires only a single fragment processing phase to perform TRP.

The following is a table showing the calculations for determining which GPU processes which protected tiles 112s according to the pseudo code provided above, and for the example set up of FIGS. 9A to 9D. "R" is used to denote that this GPU will render the numbered tile. CS0 and CS1 are used to indicate checksum 0 and checksum 1 respectively, checksum 0 being the checksum generated based on a first second of tiles and checksum 1 being the checksum generated based on a second set of tiles, by a given GPU. To avoid unnecessary consumption of memory bandwidth, frame buffer memory writes corresponding to those tiles with a destination checksum of CS1 may be filtered out.

|  | Protected_Tile_Number | 0 | 1 | 2 | 3 | 4 | 5 | Destination |
|---|---|---|---|---|---|---|---|---|
| 2 GPU system | Protected_Tile_Number mod Num_GPUs | 0 | 1 | 0 | 1 | 0 | 1 | |
| GPU0 | GPU_ID = 0 | R | | R | | R | | CS0 |
| | GPU_ID + 1 mod 2 = 1 | | R | | R | | R | CS1 |
| GPU1 | GPU_ID = 1 | | R | | R | | R | CS0 |
| | GPU_ID + 1 mod 2 = 0 | R | | R | | R | | CS1 |
| 3 GPU system | Protected_Tile_Number mod Num_GPUs | 0 | 1 | 2 | 0 | 1 | 2 | |
| GPU0 | GPU_ID = 0 | R | | | R | | | CS0 |
| | GPU_ID + 1 mod 3 = 1 | | R | | | R | | CS1 |
| GPU1 | GPU_ID = 1 | | R | | | R | | CS0 |
| | GPU_ID + 1 mod 3 = 2 | | | R | | | R | CS1 |
| GPU2 | GPU_ID = 2 | | | R | | | R | CS0 |
| | GPU_ID + 1 mod 3 = 0 | R | | | R | | | CS1 |
| 4 GPU system | Protected_Tile_Number mod Num_GPUs | 0 | 1 | 2 | 3 | 0 | 1 | |
| GPU0 | GPU_ID = 0 | R | | | | R | | CS0 |
| | GPU_ID + 1 mod 4 = 1 | | R | | | | R | CS1 |
| GPU1 | GPU_ID = 1 | | R | | | | R | CS0 |
| | GPU_ID + 1 mod 4 = 2 | | | R | | | | CS1 |
| GPU2 | GPU_ID = 2 | | | R | | | | CS0 |
| | GPU_ID + 1 mod 4 = 3 | | | | R | | | CS1 |
| GPU3 | GPU_ID = 3 | | | | R | | | CS0 |
| | GPU_ID + 1 mod 4 = 0 | R | | | | R | | CS1 |

As mentioned earlier, in general any type of checksum that enables the determination of whether data on which one checksum is generated does not match the data on which another checksum is generated may be used. The data on which the checksums are generated may be a data stream inside the GPU as the GPU processes a set of protected tiles 112s, or it may be an output of the GPU, such as pixel data generated by the fragment processing phase for each of the set of protected tiles 112s. For instance, the checksum may be generated by hashing the data using a hash function (e.g. a hash function belonging to the SHA family). Alternatively, the checksum may be generated by summing and/or concatenating the data. As another example, a digital signature generated based on the data may be used. As yet another example, the checksum may be generated by applying an XOR function to the data.

The checksum may be order dependent (e.g. a hash function). Alternatively, the checksum may be non-order dependent (e.g. summation). In general either may be used. If an order-dependent checksum is used, the GPUs are configured to process the sets of tiles in the same order. For example, FIG. 10B shows GPU0 and GPU1 processing the set of tiles 1, 3, 5, 7 in the same order. Note that processing the tiles in the same order allows for the use of an order-dependent checksum or a non-order dependent checksum. In other examples the GPU completion of tiles may be out of order. For instance, FIG. 10B shows GPU0 and GPU1 processing the set of tiles 0, 2, 4, 6, 8 in different orders. If the tiles are processed in different orders, a non-order dependent checksum must be used. In some examples, an order-dependent signature may be generated for each protected tile, and a non-order dependent checksum may be used to collate tile signatures.

In some examples, the checksum is generated based on the pixel data that is output to the pixel buffer 210. In some examples, the pixel data is output to the pixel buffer, then read back from the pixel buffer 210, with the checksum being generated based on the pixel data read back from the pixel buffer 210. This allows the memory and memory interface of the pixel buffer 210 to be assessed by checking that the data (for the non-filtered writes) can be read back correctly.

The graphics processing system may comprise a host CPU (or an equivalent component) configured to determine which tiles (protected and non-protected) are to be processed by which GPU. Alternatively, at least one of the GPUs may be configured to determine which tiles to process.

Figure 11:
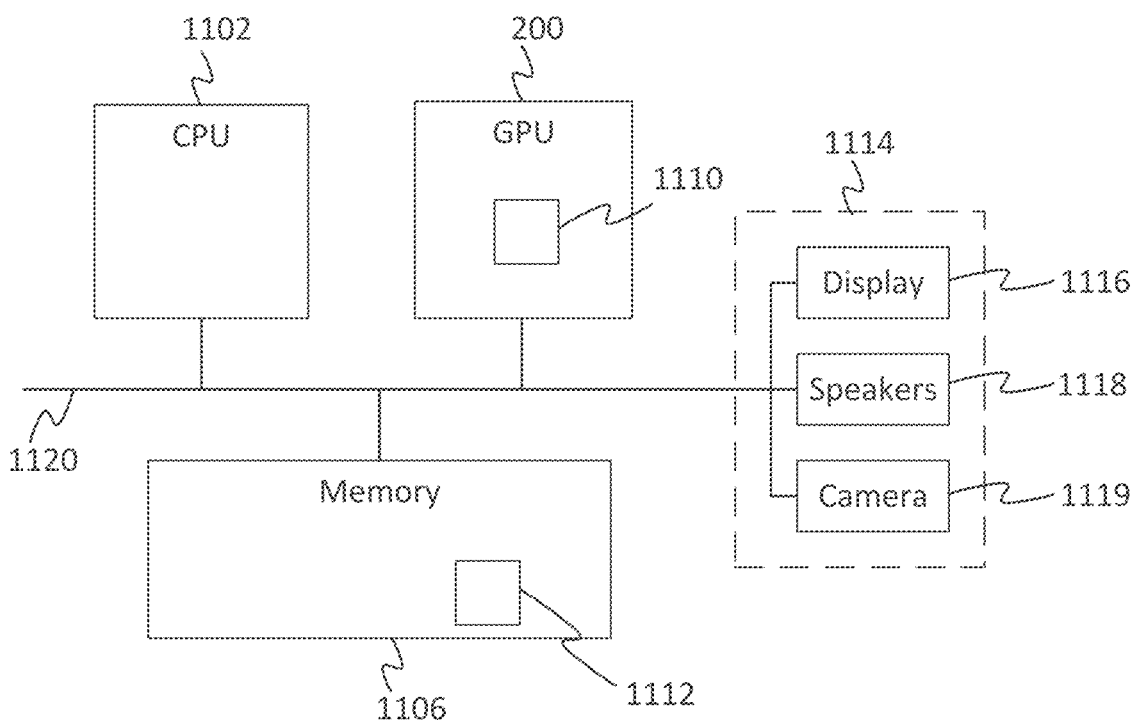
FIG. 11 is a schematic block diagram of a computer system in which a graphics processing system is implemented.

FIG. 11 shows a computer system in which the graphics processing systems described herein may be implemented. The computer system comprises a CPU 1102, a GPU 200, a memory 1106 and other devices 1114, such as a display 1116, speakers 1118 and a camera 1119. A processing block 1110 (corresponding to processing blocks 202, 204, 208, 502 of FIGS. 2, 6A, 6B, 8A and 8B) is implemented on the GPU 200. In other examples, at least part of the processing block 1110 may be implemented on the CPU 1102. Only one GPU 200 is shown, but it will be appreciated that the system comprises at least two GPUs 200a, 200b. The components of the computer system can communicate with each other via a communications bus 1120. A store 1112 (corresponding to stores 110, 116, 112 and 504) is implemented as part of the memory 1106. Each store 110, 116, 112 and 504 may be a separate store. The computer system also comprises a GPU 100 (not shown).

The graphics processing system comprising the GPUs of FIGS. 1, 5A, 5B and 7, and the GPUs of FIGS. 2, and 8A-10C are shown as comprising a number of functional blocks. This is schematic only and is not intended to define a strict division between different logic elements of such entities. Each functional block may be provided in any suitable manner.

The graphics processing system described herein may be embodied in hardware on an integrated circuit. The graphics processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 12.

Figure 12:
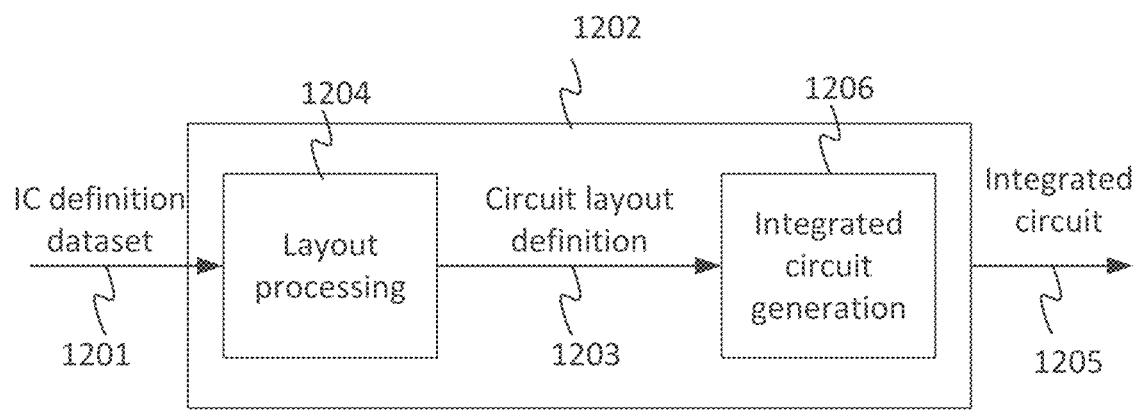
FIG. 12 is a schematic block diagram of an integrated circuit manufacturing system for generating an integrated circuit embodying a graphics processing system.

FIG. 12 shows an example of an integrated circuit (IC) manufacturing system 1202 which is configured to manufacture a graphics processing system as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1202 to manufacture an integrated circuit embodying a graphics processing system as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

According to one aspect disclosed herein, there is provided a graphics processing system as set out in the Summary section.

In embodiments, the one or more actions may comprise, if any of the pairs of checksums comprise non-matching checksums: raising a fault signal, and/or causing one or more protected tiles to be re-processed by one, some or each graphic processing unit.

In embodiments, the one or more protected tiles to be re-processed may belong to a set of protected tiles upon which non-matching checksums are generated.

In embodiments, each graphics processing unit may be configured to: output pixel data generated based on the second set of protected tiles to one or more buffers during the second fragment processing pass but not during the first fragment processing pass.

In embodiments, each graphics processing unit may be configured to: output pixel data generated based on the first set of protected tiles to one or more buffers during the first fragment processing pass but not during the second fragment processing pass.

In embodiments, at least one graphics processing unit may be configured to: during the first and/or second fragment processing pass, process one or more non-protected related tiles, each non-protected tile containing no safety-related primitives, and output pixel data generated based on the one or more non-protected tiles to one or more buffers.

In embodiments, each graphics processing unit may be configured to: during the first and/or second fragment processing pass, process one or more non-protected tiles, and output pixel data generated based on the one or more non-protected tiles to one or more buffers.

In embodiments, each graphics processing unit may be configured to: output pixel data generated based on the first set of protected tiles to a pixel buffer but not pixel data generated based on the second set of protected tiles, wherein the respective pixel data generated based on each set of protected tiles is written to a pixel buffer by only one graphics processing unit.

In embodiments, at least one graphics processing unit may be configured to: process one or more non-protected related tiles, each non-protected tile containing no safety-related primitives, and output pixel data generated based on the one or more non-protected tiles to one or more buffers.

In embodiments, each graphics processing unit may be configured to: process one or more non-protected related tiles, each non-protected tile containing no safety-related primitives, and output pixel data generated based on the one or more non-protected tiles to one or more buffers.

In embodiments, each protected tile may be associated with a respective tile number and each graphics processing unit is associated with a respective graphics processing unit number, wherein each protected tile is associated with a set identifier calculated as the respective tile number modulo a total number of the graphics processing units, and wherein, for each graphics processing unit, the first one of the two respective sets of protected tiles comprises one or more protected tiles having a respective set identifier corresponding to the respective graphics processing unit number, and wherein for each graphics processing unit, the second one of the two respective sets of protected tiles comprises one or more protected tiles having a respective set identifier corresponding to the respective graphics processing unit number plus one, modulo the total number of the graphics processing units.

In embodiments, each non-protected tile may only be processed once.

In embodiments, each graphics processing unit may be configured to: generate respective pixel data based on said processing of the two respective sets of the protected tiles; and generate each respective checksum based on at least one of the following: a hash of the respective pixel data, a summation of the respective pixel data, a concatenation of the respective pixel data, a signature generated based on the respective pixel data, and an XOR operation applied to the respective pixel data.

In embodiments, each graphic processing unit may be configured to output the respective checksums to a data store of that graphics processing unit, and wherein the comparison unit may be configured to access the respective checksums from the respective data stores.

In embodiments, the system may comprises one or more graphics processing units configured to i) process input data relating to the scene to generate the one or more safety-related primitives, and ii) based on said processing of the input data, output the tile data identifying the one or more protected tiles.

In embodiments, said one or more graphics processing units may be distinct from the plurality of graphics processing units. That is, the graphics processing unit(s) configured to perform the geometry processing phase may be different to the graphics processing units configured to perform the fragment processing phase.

In embodiments, the plurality of graphics processing units may comprise said one or more graphics processing units. That is, at least one of the graphics processing units configured to perform the fragment processing phase may also be configured to perform the geometry processing phase.

In embodiments, the input data relating to the scene may comprise geometry data describing elements in the scene, and wherein the one or more graphics processing units may be configured to process the geometry data to produce the one or more primitives representing the elements from a point of view of a frame to be rendered.

In embodiments, the one or more graphics processing units may consist of a single graphics processing units, and wherein the single graphics processing unit may be configured to: during a first geometry processing pass, process all of the geometry data to generate the one or more primitives and generate a first checksum based on the one or more primitives; and during a second geometry processing pass, process all of the geometry data to generate the one or more primitives and generate a second checksum based on the one or more primitives; wherein the second geometry processing pass begins after the first geometry processing pass has ended, and wherein a comparison unit is configured to compare the first and second checksums, and wherein the graphics processing system is configured to perform one or more actions based on an outcome of said comparison.

In embodiments, the one or more graphics processing units may comprise two graphics processing units, and wherein each of the two graphics processing units may be configured to, during a single geometry processing pass: i) process all of the geometry data to generate the one or more primitives, and ii) generate a respective checksum based on the one or more primitives, and wherein a comparison unit is configured to compare the respective checksums, and wherein the graphics processing system is configured to perform one or more actions based on an outcome of said comparison.

In embodiments, the graphics processing system may be embodied in hardware on an integrated circuit.

According to further aspects disclosed herein, there may be provided a corresponding method of operating the graphics processing system, and a corresponding computer program configured to operate the graphics processing system. According to yet further aspects there may be provided a corresponding method of manufacturing the graphics processing system, a corresponding manufacturing facility arranged to manufacture the graphics processing system, and a corresponding circuit design data set embodied on computer-readable storage.

For instance according to one aspect there may be provided a non-transitory computer readable storage medium having stored thereon a computer readable description of the graphics processing system of any embodiment herein which, when processed in an integrated circuit manufacturing system, causes the integrated circuit manufacturing system to: process, using a layout processing system, the computer readable description of the graphics processing system so as to generate a circuit layout description of an integrated circuit embodying said graphics processing system; and manufacture, using an integrated circuit generation system, the graphics processing system according to the circuit layout description.

According to another aspect, there may be provided an integrated circuit manufacturing system comprising: a non-transitory computer readable storage medium having stored thereon a computer readable description of the graphics processing system of any embodiment disclosed herein; a layout processing system configured to process the computer readable description so as to generate a circuit layout description of an integrated circuit embodying said graphics processing system; and an integrated circuit generation system configured to manufacture the graphics processing system according to the circuit layout description.

According to another aspect there may be provided a method of manufacturing, using an integrated circuit manufacturing system, a graphics processing system of any embodiment disclosed herein, the method comprising: processing, using a layout processing system, a computer readable description of said circuit so as to generate a circuit layout description of an integrated circuit embodying the graphics processing system; and manufacturing, using an integrated circuit generation system, the graphics processing system according to the circuit layout description.

According to another aspect there may be provided a layout processing system configured to determine positional information for logical components of a circuit derived from the integrated circuit description so as to generate a circuit layout description of an integrated circuit embodying the graphics processing system of any embodiment disclosed herein.

Other variants, implementations and/or applications of the disclosed techniques may become apparent to a person skilled in the art once given the disclosure herein. The scope of the present disclosure is not limited by the above-described embodiments but only by the claims.

What is claimed is:

1. A graphics processing system for performing tile-based rendering of a scene, wherein the system comprises:
   a plurality of graphics processing units, wherein each graphics processing unit is configured to i) receive tile data identifying one or more protected tiles, ii) process two respective sets of the protected tiles, and iii) based on said processing, generate two respective checksums, one for each respective set of protected tiles, wherein each respective set of protected tiles is processed by two different graphics processing units; and
   a comparison unit configured to compare one or more pairs of checksums, wherein each pair comprises a respective checksum generated based on a same respective set of protected tiles and generated by different graphics processing units, and wherein the graphics processing system is configured to perform one or more actions based on an outcome of said comparison.

2. The graphics processing system of claim 1, wherein the one or more actions comprise, if any of the pairs of checksums comprise non-matching checksums:
   raising a fault signal, and/or
   causing one or more protected tiles to be re-processed by one, some or each graphic processing unit.

3. The graphics processing system of claim 2, wherein the one or more protected tiles to be re-processed belong to a set of protected tiles upon which non-matching checksums are generated.

4. The graphics processing system of claim 1, wherein each graphics processing unit is configured to:
during a first fragment processing pass, process a first one of the two respective sets of protected tiles and generate the respective checksum generated based on the first set of protected tiles; and
during a second fragment processing pass, process a second one of the two respective sets of protected tiles and generate the respective checksum generated based on the second set of protected tiles, wherein the second fragment processing pass begins after the first fragment processing pass has ended.

5. The graphics processing system of claim 4, wherein each graphics processing unit is configured to:
output pixel data generated based on the first set of protected tiles to one or more buffers during the first fragment processing pass but not during the second fragment processing pass.

6. The graphics processing system of claim 4, wherein at least one graphics processing unit is configured to:
during the first and/or second fragment processing pass, process one or more non-protected related tiles, and output pixel data generated based on the one or more non-protected tiles to one or more buffers.

7. The graphics processing system of claim 6, wherein each graphics processing unit is configured to:
during the first and/or second fragment processing pass, process one or more non-protected tiles, and output pixel data generated based on the one or more non-protected tiles to one or more buffers.

8. The graphics processing system of claim 6, wherein each non-protected tile is only processed once.

9. The graphics processing system of claim 1, wherein each graphics processing unit is configured to:
output pixel data generated based on the second set of protected tiles to one or more buffers during the second fragment processing pass but not during the first fragment processing pass.

10. The graphics processing system of claim 1, wherein each graphics processing unit is configured to, during a single fragment processing pass:
process a first one of the two respective sets of protected tiles and generate the respective checksum based on the first set of protected tiles; and
process a second one of the two respective sets of protected tiles and generate the respective checksum based on the second set of protected tiles.

11. The graphics processing system of claim 10, wherein each graphics processing unit is configured to:
output pixel data generated based on the first set of protected tiles to a pixel buffer but not pixel data generated based on the second set of protected tiles, wherein the respective pixel data generated based on each set of protected tiles is written to a pixel buffer by only one graphics processing unit.

12. The graphics processing system of claim 10, wherein at least one graphics processing unit is configured to:
process one or more non-protected related tiles, and output pixel data generated based on the one or more non-protected tiles to one or more buffers.

13. The graphics processing system of claim 10, wherein each protected tile is associated with a respective tile number and each graphics processing unit is associated with a respective graphics processing unit number, wherein each protected tile is associated with a set identifier calculated as the respective tile number modulo a total number of the graphics processing units, and wherein, for each graphics processing unit, the first one of the two respective sets of protected tiles comprises one or more protected tiles having a respective set identifier corresponding to the respective graphics processing unit number, and wherein for each graphics processing unit, the second one of the two respective sets of protected tiles comprises one or more protected tiles having a respective set identifier corresponding to the respective graphics processing unit number plus one, modulo the total number of the graphics processing units.

14. The graphics processing system of claim 1, wherein each graphics processing unit is configured to:
generate respective pixel data based on said processing of the two respective sets of the protected tiles; and
generate each respective checksum based on at least one of the following:
a hash of the respective pixel data,
a summation of the respective pixel data,
a concatenation of the respective pixel data,
a signature generated based on the respective pixel data, and
an XOR operation applied to the respective pixel data.

15. The graphics processing system of claim 1, wherein the system comprises one or more graphics processing units configured to i) process input data relating to the scene to generate the one or more safety-related primitives, and ii) based on said processing of the input data, output the tile data identifying the one or more protected tiles.

16. The graphics processing system of claim 15, wherein the input data relating to the scene comprises geometry data describing elements in the scene, and wherein the one or more graphics processing units are configured to process the geometry data to produce the one or more primitives representing the elements from a point of view of a frame to be rendered.

17. The graphics processing system of claim 16, wherein the one or more graphics processing units consists of a single graphics processing units, and wherein the single graphics processing unit is configured to:
during a first geometry processing pass, process all of the geometry data to generate the one or more primitives and generate a first checksum based on the one or more primitives; and
during a second geometry processing pass, process all of the geometry data to generate the one or more primitives and generate a second checksum based on the one or more primitives; wherein the second geometry processing pass begins after the first geometry processing pass has ended, and
wherein a comparison unit is configured to compare the first and second checksums, and wherein the graphics processing system is configured to perform one or more actions based on an outcome of said comparison.

18. The graphics processing system of claim 16, wherein the one or more graphics processing units comprises two graphics processing units, and wherein each of the two graphics processing units is configured to, during a single geometry processing pass: i) process all of the geometry data to generate the one or more primitives, and ii) generate a respective checksum based on the one or more primitives, and
wherein a comparison unit is configured to compare the respective checksums, and wherein the graphics processing system is configured to perform one or more actions based on an outcome of said comparison.

19. A non-transitory computer readable storage medium having stored thereon a computer readable dataset description of a graphics processing system for performing tile-based rendering of a scene that, when processed in an integrated circuit manufacturing system, causes the integrated circuit manufacturing system to manufacture an integrated circuit embodying the graphics processing system, wherein the graphics processing system comprises:
  a plurality of graphics processing units, wherein each graphics processing unit is configured to i) receive tile data identifying one or more protected tiles, ii) process two respective sets of the protected tiles, and iii) based on said processing, generate two respective checksums, one for each respective set of protected tiles, wherein each respective set of protected tiles is processed by two different graphics processing units; and
  a comparison unit configured to compare one or more pairs of checksums, wherein each pair comprises a respective checksum generated based on a same respective set of protected tiles and generated by different graphics processing units, and wherein the graphics processing system is configured to perform one or more actions based on an outcome of said comparison.

20. A method of performing tile-based rendering of a scene, wherein the method comprises:
  each of a plurality of graphics processing units receiving tile data identifying one or more protected tiles, processing two respective sets of the protected tiles, and based on said processing, generating two respective checksums, one for each respective set of protected tiles, wherein each set of protected tiles is processed by two different graphics processing units;
  comparing one or more pairs of checksums, wherein each pair comprises a respective checksum generated based on a same respective set of protected tiles and generated by a different graphics processing units; and
  performing one or more actions based on an outcome of said comparison.

* * * * *